US012632284B2

(12) United States Patent
Chen et al.

(10) Patent No.: US 12,632,284 B2
(45) Date of Patent: May 19, 2026

(54) TASK MANAGEMENT BETWEEN ELECTRONIC DEVICES WITH DIFFERENT OPERATING SYSTEMS

(71) Applicant: Huawei Technologies Co., Ltd., Shenzhen (CN)

(72) Inventors: Kang Chen, Hangzhou (CN); Xiangyu Niu, Shenzhen (CN); Huifeng Hu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 18/017,329

(22) PCT Filed: Jul. 22, 2021

(86) PCT No.: PCT/CN2021/107926
§ 371 (c)(1),
(2) Date: Jan. 20, 2023

(87) PCT Pub. No.: WO2022/017474
PCT Pub. Date: Jan. 27, 2022

(65) Prior Publication Data
US 2023/0297414 A1 Sep. 21, 2023

(30) Foreign Application Priority Data

Jul. 24, 2020 (CN) .......................... 202010724778.2

(51) Int. Cl.
*G06F 9/46* (2006.01)
*G06F 9/48* (2006.01)
(Continued)

(52) U.S. Cl.
CPC ............ *G06F 9/466* (2013.01); *G06F 9/4881* (2013.01); *G06F 9/4893* (2013.01); *G06F 9/542* (2013.01);
(Continued)

(58) Field of Classification Search
None
See application file for complete search history.

(56) References Cited

U.S. PATENT DOCUMENTS 7,933,635 B2 * 4/2011 Oh ........................ H04W 28/14
455/574
8,977,672 B2 * 3/2015 Karandikar ......... H04L 67/1095
709/202
(Continued)

FOREIGN PATENT DOCUMENTS

CN 104035683 A 9/2014
CN 104503834 A 4/2015
(Continued)

*Primary Examiner* — Abu Zar Ghaffari
(74) *Attorney, Agent, or Firm* — Slater Matsil, LLP

(57) ABSTRACT

The method includes: the second electronic device may send, in response to a first user operation, a first background task request to a first distributed system of the first electronic device by using a second distributed system. The first electronic device detects, by using the first distributed system, whether a task execution condition of a first background task is met. When the task execution condition is met, the first electronic device sends a first notification to the second distributed system of the second electronic device by using the first distributed system. In response to the received first notification, the second electronic device notifies, by using the second distributed system, a first application to execute the first background task.

16 Claims, 15 Drawing Sheets

(51) Int. Cl.

| | |
|---|---|
| *G06F 9/54* | (2006.01) |
| *G06F 11/30* | (2006.01) |
| *G06F 11/34* | (2006.01) |
| *H04W 52/02* | (2009.01) |

(52) U.S. Cl.

CPC ...... *G06F 11/3051* (2013.01); *G06F 11/3433* (2013.01); *H04W 52/0225* (2013.01); *G06F 11/302* (2013.01); *G06F 2201/865* (2013.01); *H04W 52/0264* (2013.01); *Y02D 30/70* (2020.08)

(56) References Cited

U.S. PATENT DOCUMENTS

| | | | | |
|---|---|---|---|---|
| 10,257,785 | B2 * | 4/2019 | Kim | H04W 52/0264 |
| 11,138,032 | B2 * | 10/2021 | Choi | G06F 9/543 |

| | | | | |
|---|---|---|---|---|
| 2015/0071068 | A1 * | 3/2015 | Gupta | H04W 52/0254 |
| | | | | 370/235 |
| 2015/0105020 | A1 * | 4/2015 | Aida | H04M 1/6091 |
| | | | | 455/41.2 |
| 2015/0347204 | A1 | 12/2015 | Stanley-Marbell et al. | |
| 2016/0353407 | A1 * | 12/2016 | Hsu | H04W 4/20 |
| 2017/0048661 | A1 * | 2/2017 | Park | H04W 4/70 |
| 2017/0118789 | A1 * | 4/2017 | Lee | H04B 1/385 |
| 2018/0352580 | A1 * | 12/2018 | Wang | H04W 4/60 |
| 2019/0033928 | A1 * | 1/2019 | Seo | G06F 1/1669 |
| 2019/0124195 | A1 * | 4/2019 | Kim | H04M 1/72412 |
| 2020/0052922 | A1 * | 2/2020 | Lee | H04L 12/2823 |
| 2020/0323032 | A1 * | 10/2020 | Kim | H04W 76/27 |
| 2021/0311783 | A1 * | 10/2021 | Lee | G06F 9/46 |

FOREIGN PATENT DOCUMENTS

| | | | |
|---|---|---|---|
| CN | 104770045 | B | 10/2019 |
| WO | 2017101332 | A1 | 6/2017 |

* cited by examiner

Second electronic device 20

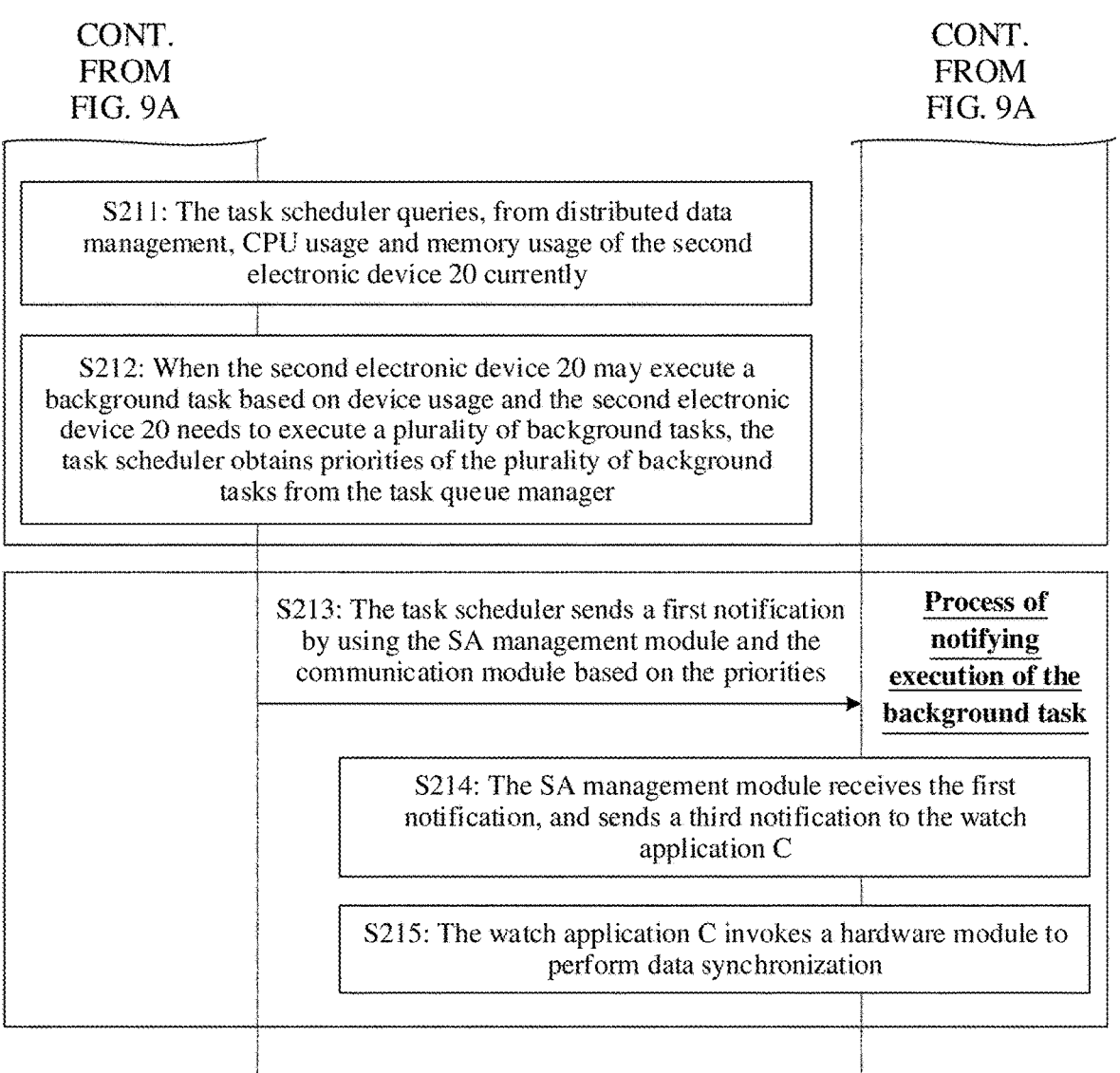

CONT.
FROM
FIG. 9A

CONT.
FROM
FIG. 9A

S211: The task scheduler queries, from distributed data management, CPU usage and memory usage of the second electronic device 20 currently S212: When the second electronic device 20 may execute a background task based on device usage and the second electronic device 20 needs to execute a plurality of background tasks, the task scheduler obtains priorities of the plurality of background tasks from the task queue manager S213: The task scheduler sends a first notification by using the SA management module and the communication module based on the priorities

Process of notifying execution of the background task

S214: The SA management module receives the first notification, and sends a third notification to the watch application C S215: The watch application C invokes a hardware module to perform data synchronization

FIG. 9B

TASK MANAGEMENT BETWEEN ELECTRONIC DEVICES WITH DIFFERENT OPERATING SYSTEMS

CROSS-REFERENCE TO RELATED APPLICATIONS

This application is a National Stage of International Application No. PCT/CN2021/107926, filed on Jul. 22, 2021, which claims priority to Chinese Patent Application No. 202010724778.2, filed on Jul. 24, 2020. Both of the aforementioned applications are hereby incorporated by reference in their entireties.

TECHNICAL FIELD

This application relates to the field of electronic technologies, and in particular, to a task execution method and a related apparatus.

BACKGROUND

Currently, systems of electronic devices such as mobile phones, smartwatches, or bands may obtain background tasks of applications installed in the electronic devices, and monitor device status information such as time, battery statuses, and network connection statuses based on the background tasks. An electronic device may process a plurality of background tasks under a specific condition or at specific time. For example, when the electronic device starts charging and accesses Wi-Fi, the electronic device executes tasks of pushing notifications or synchronizing data. This can reduce frequent wake-ups of the system for execution of background tasks, so as to increase continuous sleep time of the electronic device. Therefore, system power consumption is reduced, and overheads of a memory and a processor in the electronic device are reduced as well.

However, for an electronic device like the smartwatch or the band, both its memory and a processing capability of its processor are limited. When memory usage and processor usage are high, the electronic device like the smartwatch or the band struggles to monitor device status information. This is not conducive to execution of background tasks.

SUMMARY

This application provides a task processing method and a related apparatus. When a mobile phone detects, by using a distributed system of the mobile phone, that a task execution condition of a smartwatch is met, the mobile phone may trigger the smartwatch to execute a background task. Because a processing capability of a processor and a memory of the mobile phone are far stronger than those of the smartwatch, the following is less frequent: an electronic device like a smartwatch struggles to monitor a task execution condition when memory usage and processor usage are high. Therefore, efficiency of executing a background task is improved.

According to a first aspect, this application provides a task processing system. The system includes a first electronic device and a second electronic device. The first electronic device establishes a communication connection to the second electronic device. A first distributed system is installed in the first electronic device. A second distributed system is installed in the second electronic device. A first application is installed in the second electronic device. The second electronic device is configured to: in response to a first user operation received by using the first application, send a first background task request to the first distributed system of the first electronic device by using the second distributed system. The first background task request carries a task execution condition of a first background task. The first electronic device is configured to: in response to receiving the first background task request, detect, by using the first distributed system, whether the task execution condition of the first background task is met. The first electronic device is further configured to: when it is detected that the task execution condition of the first background task is met, send a first notification to the second distributed system of the second electronic device by using the first distributed system. The first notification is used to notify the first application to execute the first background task. The second electronic device is configured to: in response to the received first notification, notify, by using the second distributed system, the first application to execute the first background task.

According to the method provided in the first aspect, when the first electronic device detects, by using the first distributed system, that a task execution condition of the second electronic device is met, the second electronic device may be triggered to execute a background task. In this way, because a processing capability of a processor and a memory of the first electronic device are far stronger than those of the second electronic device, the following is less frequent: the second electronic device struggles to monitor a task execution condition when memory usage and processor usage are high. Therefore, efficiency of executing a background task is improved.

For example, the first electronic device is a mobile phone, and the second electronic device is a smartwatch. The first distributed system is installed in the mobile phone, and the second distributed system is installed in the smartwatch. The distributed system is, for example, the HarmonyOS. A processing capability of a processor and a memory of the mobile phone are far more powerful than those of the smartwatch or band. Therefore, the electronic device like the mobile phone may be used as a core device, and a task execution condition of another device (for example, the smartwatch in which the second distributed system is installed) is monitored by using the first distributed system installed in the mobile phone. When the mobile phone detects, by using the first distributed system, that a task execution condition of the smartwatch is met, the smartwatch may be triggered to execute a background task. In this way, because a processing capability of a processor and a memory of the mobile phone are far stronger than those of the smartwatch, the following is less frequent: an electronic device like a smartwatch struggles to monitor a task execution condition when memory usage and processor usage are high. Therefore, efficiency of executing a background task is improved.

According to a second aspect, an embodiment of this application provides a task processing method. The method is applied to a second electronic device. The second electronic device establishes a communication connection to a first electronic device. A first application is installed in the second electronic device. The method includes: A first distributed system is installed in the first electronic device. A second distributed system is installed in the second electronic device. The second electronic device receives a first user operation by using the first application. In response to the first user operation, the second electronic device sends a first background task request to the first distributed system of the first electronic device by using the second distributed system. The first background task request carries a task execution condition of a first background task. The first background task request is used by the first electronic device to detect, by using the first distributed system, whether the task execution condition of the first background task is met. The second electronic device receives a first notification. The first notification is used to notify the first application to execute the first background task. In response to the received first notification, the second electronic device notifies, by using the second distributed system, the first application to execute the first background task.

According to the method provided in the second aspect, a task execution condition of the second electronic device may be monitored by the first electronic device. When the first electronic device detects, by using the first distributed system, that the task execution condition of the second electronic device is met, the second electronic device may be triggered to execute a background task. In this way, because a processing capability of a processor and a memory of the first electronic device are far stronger than those of the second electronic device, the following is less frequent: the second electronic device struggles to monitor a task execution condition when memory usage and processor usage are high. Therefore, efficiency of executing a background task is improved.

In this embodiment of this application, an operation for triggering the first application to generate a background task is not limited to the first user operation performed on the second electronic device, or may alternatively be a user operation performed on a user interface of the connected first electronic device. In some other embodiments of this application, the first background task may alternatively be sent by an application to a task scheduler of a task scheduling SA by using the Harmony KIT in advance, and may not be triggered by a user operation. This is not limited in this embodiment of this application.

The first background task request may carry the task execution condition of the first background task, a task ID of the first background task, and a name of an application package that executes the first background task. The first background task request may also carry an identifier of a device that executes the first background task.

For example, the first background task request may be used to request to synchronize contact information associated with a MeeTime account. The task execution condition may include: 1. Remaining power of the second electronic device is greater than 30%. 2. The second electronic device successfully accesses Wi-Fi, and may access a mobile communication network through Wi-Fi. The task ID uniquely identifies the background task. The application executing the background task may be indicated by using an application package name. The application may be a watch application C. The first electronic device sends the first notification to a communication module of the second electronic device when it is detected that the task execution condition of the background task is met. The first notification may be used to notify the watch application C to start executing a background task corresponding to an ID of the first background task, namely, a background task of data synchronization. The watch application C on the second electronic device invokes a hardware module to perform data synchronization.

The first electronic device may establish a communication connection to the second electronic device. The communication connection may be a short-range wireless communication connection (for example, a Wi-Fi connection or a Bluetooth connection), or may be a mobile network connection (for example, a connection established through cellular mobile communications technologies such as 3G, LTE, and 5G or WAN technologies).

With reference to the second aspect, in some embodiments, the first application is a contact application installed in the second electronic device. The first background task is a background task of synchronizing one or more contacts of the first application. After the second electronic device notifies, by using the second distributed system, the first application to execute the first background task, the method further includes: The second electronic device displays a first prompt on the first application. The first prompt is used to indicate that the first application has performed contact synchronization.

In this embodiment of this application, the first electronic device may further query, by using distributed data management, whether the first application is in a running state, and notify the first application to execute the first background task only when the first application is in a running state.

With reference to the second aspect, in some embodiments, the method further includes: The second electronic device synchronizes data in distributed data management to the first electronic device by using the second distributed system. The data in the distributed data management is a reference factor used by the first electronic device to determine whether the task execution condition of the first background task is met.

In some embodiments of this application, the data in the distributed data management may include a device status parameter monitored by the first electronic device. The device status parameter may include a device status parameter of a local device and a device status parameter of a remote device. (1) The device status parameter of the local device includes, for example, whether the local device is in an idle state, a device time parameter, a device connection status, a device battery status, a device storage status, and a network connection status. (2) The device status parameter of the remote device includes, for example, whether the remote device is in an idle state, a device time parameter, a device connection status, a device battery status, a device storage status, and a network connection status.

With reference to the second aspect, in some embodiments, the data in the distributed data management includes at least one of the following: a frequency of using the first application on the second electronic device, or historical statistics duration of executing the first background task. The data in the distributed data management is also a reference factor used by the first electronic device to determine a priority of the first background task. The priority is used by the first electronic device to determine a sequence of executing a plurality of background tasks by the second electronic device.

(1) A priority of a background task is determined based on a frequency of using an application.

The first electronic device may collect statistics for usage frequency and daily usage time about a local application/an application on the remote device, and determine a priority of a background task of an application based on the statistics for the usage frequency and daily usage time about the application. A higher usage frequency and longer daily usage duration indicate a higher priority of a background task of an application.

The statistics for usage frequency and daily usage time about the application on the remote device can be obtained from the distributed data management. The distributed data management in the first electronic device may be synchronized with that in the second electronic device, to obtain current latest data of each application on the second electronic device.

A task queue manager may divide applications into the following types: (A) an application more frequently run by a user, (B) an application frequently run by a user, (C) an application run by a user frequently but not every day, (D) an application less infrequently run by a user, and (E) an application never run by a user. The first electronic device sequentially lowers priority settings of corresponding background tasks based on statistics of (A) to (E).

(2) A priority of a background task is determined based on historical statistics duration of executing the background task.

In this embodiment of this application, the first electronic device may obtain historical statistics duration of executing a background task. A background task with longer historical statistics duration has a lower priority, and a background task with shorter historical statistics duration has a higher priority. For example, a task queue manager may alternatively divide applications into the following types: (A) a background task of an application interacting currently, (B) a background task that meets a task execution condition as detected last time but is not executed, (C) a background task whose historical statistics duration is less than 10% of a specified threshold, (D) a background task whose historical statistics duration is greater than 10% of a specified threshold and less than 50% of the specified threshold, (E) a background task whose historical statistics duration is greater than 50% of a specified threshold and less than 90% of the specified threshold; and (F) a background task whose historical statistics duration is greater than a specified threshold. The second electronic device sequentially lowers priority settings of corresponding background tasks based on statistics of (A) to (F).

With reference to the second aspect, in some embodiments, the execution condition of the first background task includes: Remaining power of the second electronic device is greater than 30%, and the second electronic device accesses a communication network through Wireless Fidelity Wi-Fi.

For example, in the "1+8+N" strategy, "1" means that mobile phones can be used as core devices, and "8" means four large-screen devices (personal computers, tablets, smart big screens, and head units) and 4 non-large-screen devices (headphones, speakers, smartwatches, and glasses). "N" is a HiLink ecosystem composed of IoT hardware. Distributed systems can be installed in all devices in the "1+8+N" strategy. The mobile phones, as the core devices, monitors task execution conditions of other devices through installed distributed systems (e.g. devices represented by "8" and devices represented by "N"). The second electronic device may be included in the devices represented by "8". When the mobile phone detects, by using the distributed system, that the task execution condition of the second electronic device is met, the mobile phone may notify, by using a communication module, the second electronic device to execute a task. In this way, because a processing capability of a processor and a memory of the mobile phone may be far stronger than those of the smartwatch or the band, the following is less frequent: the second electronic device struggles to monitor a task execution condition when memory usage and processor usage are high. Therefore, efficiency of executing a background task is improved.

According to a third aspect, an embodiment of this application provides a task processing method. The method is applied to a first electronic device. The first electronic device establishes a communication connection to a second electronic device. A first distributed system is installed in the first electronic device. A second distributed system is installed in the second electronic device. A first application is installed in the second electronic device. The method includes: The first electronic device receives a first background task request from the second distributed system of the second electronic device by using the first distributed system. The first background task request carries a task execution condition of a first background task. The first background task is a background task of the first application. The first electronic device detects, by using the first distributed system, whether the task execution condition of the first background task is met. When it is detected that the task execution condition of the first background task is met, the first electronic device sends a first notification to the second distributed system of the second electronic device by using the first distributed system. The first notification is used to notify the first application to execute the first background task.

According to the method provided in the third aspect, when the first electronic device detects, by using the first distributed system, that a task execution condition of the second electronic device is met, the second electronic device may be triggered to execute a background task. In this way, because a processing capability of a processor and a memory of the first electronic device are far stronger than those of the second electronic device, the following is less frequent: the second electronic device struggles to monitor a task execution condition when memory usage and processor usage are high. Therefore, efficiency of executing a background task is improved.

With reference to the third aspect, in some embodiments, a second application is installed in the first electronic device. The method further includes: The first electronic device receives a second user operation by using the second application. In response to the second user operation, the first electronic device detects, by using the first distributed system, whether a task execution condition of a second background task is met. The second background task is a background task of the second application. When it is detected that the task execution condition of the second background task is met, the first electronic device notifies, by using the first distributed system, the second application to execute the second background task.

A second background task request may carry a task execution condition, a task ID, and an application executing the task. The second background task request may be used to request to synchronize contact information associated with a MeeTime account. The task execution condition may include: 1. Remaining power of the first electronic device is greater than 30%. 2. The first electronic device successfully accesses Wi-Fi, and may access a mobile communication network through Wi-Fi. The task ID uniquely identifies the background task. The application executing the task may be indicated by using an application package name. The application may be a contact application. The second user operation may be a user operation performed on a synchronization control in the second application.

In response to the user operation performed on the synchronization control in the second application, the first electronic device may display a state of the synchronization control as an on state. In the on state, a background task triggering in the first electronic device may detect whether an execution condition of the background task of data synchronization is met. When the state of the synchronization control is displayed as the on state, a user interface of the second application may further include a prompt, which may be last data synchronization time, for example, "Last synchronized at 11:06 Jun. 27, 2020". In this embodiment of this application, in response to the user operation performed on the synchronization control, the second application on the first electronic device may perform data synchronization, record system time of current data synchronization, and display the system time in the prompt.

With reference to the third aspect, in some embodiments, the second application is a contact application installed in the first electronic device. The second background task is a background task of synchronizing one or more contacts of the second application. After the first electronic device notifies, by using the first distributed system, the second application to execute the second background task, the method further includes: The first electronic device displays a second prompt on the second application. The second prompt is used to indicate that the second application has performed contact synchronization.

With reference to the third aspect, in some embodiments, the first distributed system includes distributed data management. That the first electronic device detects, by using the first distributed system, whether the task execution condition of the first background task is met includes: The first electronic device obtains a status parameter of the second electronic device from the distributed data management. The first electronic device determines, based on the status parameter of the second electronic device, whether the task execution condition of the second background task is met.

With reference to the third aspect, in some embodiments, when it is detected that the task execution condition of the first background task is met, the method further includes: The first electronic device obtains processor usage and memory usage of the second electronic device by using the first distributed system. That the first electronic device sends a first notification to the second distributed system of the second electronic device by using the first distributed system includes: When the processor usage is less than a first specified threshold and the memory usage is less than a second specified threshold, the first electrical device sends the first notification to the second distributed system of the second electronic device by using the first distributed system.

With reference to the third aspect, in some embodiments, the first electronic device stores priorities of a plurality of background tasks of the second electronic device. The plurality of background tasks include the first background task. When it is detected that the task execution condition of the first background task is met, the method further includes: The first electronic device obtains a priority of the first background task by using the first distributed system. That the first electronic device sends a first notification to the second distributed system of the second electronic device by using the first distributed system includes: The first electronic device sends the first notification to the second distributed system of the second electronic device based on the priority of the first background task by using the first distributed system.

With reference to the third aspect, in some embodiments, the first distributed system further includes the distributed data management. The method further includes: The first electronic device receives data from the second distributed system of the second electronic device by using the first distributed system, and stores the data in the distributed data management. The data in the distributed data management includes at least one of the following: a frequency of using the first application on the second electronic device, or the first application on the second electronic device, or historical statistics duration of executing the first background task. The priority of the first background task is determined by using the data in the distributed data management.

According to a fourth aspect, an embodiment of this application provides a second electronic device. The second electronic device includes one or more processors and a memory. A first application is installed in the second electronic device. A second distributed system is installed in the second electronic device. The memory is coupled to the one or more processors, the memory is configured to store computer program code, and the memory is further configured to store the second distributed system. The computer program code includes computer instructions. The one or more processors invoke the computer instructions, so that the electronic device is enabled to perform the task processing method according to the second aspect.

According to a fifth aspect, an embodiment of this application provides a first electronic device. The first electronic device includes one or more processors and a memory. A second application is installed in the first electronic device. A first distributed system is installed in the first electronic device. The memory is coupled to the one or more processors, the memory is configured to store computer program code, and the memory is further configured to store the first distributed system. The computer program code includes computer instructions. The one or more processors invoke the computer instructions, so that the electronic device is enabled to perform the task processing method according to the third aspect.

According to a sixth aspect, an embodiment of this application provides a chip. The chip is applied to a second electronic device, and the chip includes one or more processors. The processor is configured to invoke computer instructions, so that the second electronic device is enabled to perform the method according to any one of the second aspect and the possible implementations of the second aspect.

According to a seventh aspect, an embodiment of this application provides a chip. The chip is applied to a first electronic device, and the chip includes one or more processors. The processor is configured to invoke computer instructions, so that the first electronic device is enabled to perform the method according to any one of the third aspect and the possible implementations of the third aspect.

According to an eighth aspect, an embodiment of this application provides a computer program product including instructions. When the computer program product runs on a second electronic device, the electronic device is enabled to perform the method according to any one of the second aspect and the possible implementations of the second aspect.

According to a ninth aspect, an embodiment of this application provides a computer program product including instructions. When the computer program product runs on a first electronic device, the first electronic device is enabled to perform the method according to any one of the third aspect and the possible implementations of the third aspect.

According to a tenth aspect, an embodiment of this application provides a computer-readable storage medium, including instructions. When the instructions are run on a second electronic device, the second electronic device is enabled to perform the method according to any one of the second aspect and the possible implementations of the second aspect.

According to an eleventh aspect, an embodiment of this application provides a computer-readable storage medium, including instructions. When the instructions are run on a first electronic device, the first electronic device is enabled to perform the method according to any one of the third aspect and the possible implementations of the third aspect.

It may be understood that, the electronic device provided in the fourth aspect, the electronic device provided in the fifth aspect, the chip provided in the sixth aspect, the chip provided in the seventh aspect, the computer program product provided in the eighth aspect, the computer program product provided in the ninth aspect, the computer storage medium provided in the tenth aspect, and the computer storage medium provided in the eleventh aspect are all configured to perform the method provided in embodiments of this application. Therefore, for beneficial effects that can be achieved, refer to beneficial effects in a corresponding method. Details are not described herein again.

BRIEF DESCRIPTION OF THE DRAWINGS

The following describes the accompanying drawings used in embodiments of this application.

FIG. 9A and FIG. 9B are a schematic flowchart of a background task execution method according to an embodiment of this application;

Figure 1:
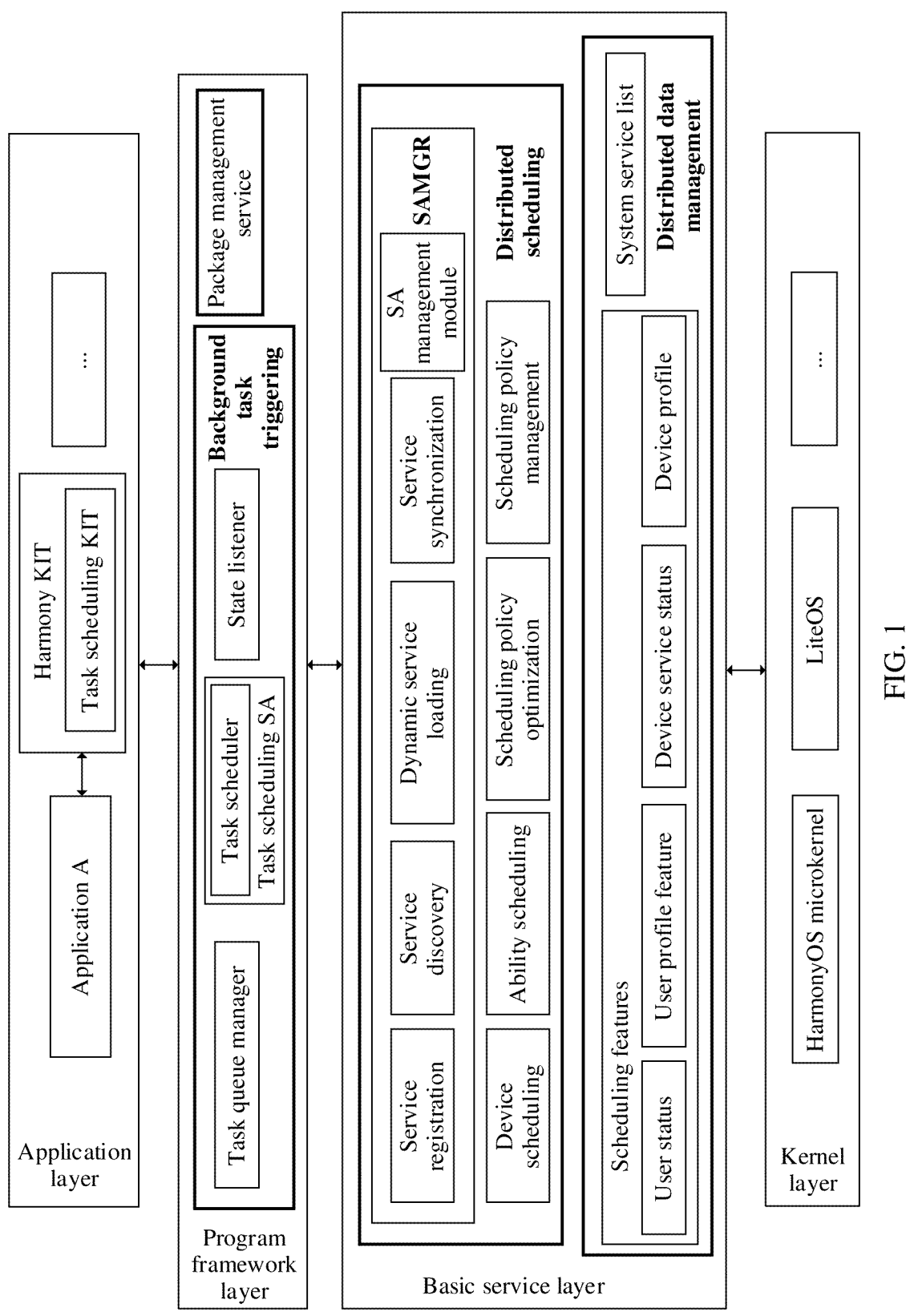
FIG. 1 is a schematic diagram of an architecture of a software system of the HarmonyOS according to an embodiment of this application.

DETAILED DESCRIPTION OF ILLUSTRATIVE
EMBODIMENTS

The following describes embodiments of this application with reference to the accompanying drawings in embodiments of this application. The terms used in implementations of embodiments of this application are merely used to explain specific embodiments of this application, and are not intended to limit this application.

First, an application scenario in embodiments of this application is described. An electronic device sometimes needs to execute a background task of an application under certain circumstances. For example, the electronic device runs a background task after a delay of a certain period of time, or under an operating condition (for example, a Wi-Fi connection state) in a specific network, or when the electronic device is in an idle state. The background task is a task that can run in the background in an application installed in the electronic device. Even if the application has stopped, the background task of the application can still be executed in the background. The background task is, for example, pushing an application notification, synchronizing or backing up contact data.

In embodiments of this application, the background task may include any one or more of the following:

(1) a task that needs to be periodically executed in the background, for example, periodically updating a database of an application;

(2) a background task that may not be timely executed, for example, delaying application version update;

(3) a background task that needs to be executed during charging of a device, or a background task that does not need to be frequently executed but is relatively time-consuming and power-consuming, for example, uploading some resources of an application during charging of the device, and downloading some data from the network for the application during charging of the device;

(4) a task that needs to be executed when a device is idle (for example, in a sleep state), for example, updating an application database when the device is in a sleep state; and (5) a background task executed in a specific network state (for example, in a Wi-Fi connection state).

The Android (android) system may provide a system service used to resolve a background task. The system service may be JobScheduler. The system can execute background tasks in batches through the system service when conditions are met. This can reduce frequent wake-ups of a hardware module by the system, to reduce memory and processor overheads in the electronic device.

However, the existing Android system is bound to hardware, that is, the system can only monitor an execution condition of a background task of the device, and trigger the background task of the device. For the electronic device like a smartwatch or a band, a memory and a processing capability of a processor are limited. When memory usage and processor usage are high, the electronic device like the smartwatch or the band struggles to monitor the execution condition of the background task. This is not conducive to execution of the background task.

In embodiments of this application, a distributed system may be installed in the electronic device like a mobile phone, the smartwatch, or the band. For example, a first distributed system is installed in the mobile phone, and a second distributed system is installed in the smartwatch. The distributed system is, for example, the Harmony operating system (Harmony operating system, HarmonyOS). A processing capability of a processor and a memory of the mobile phone are far more powerful than those of the smartwatch or band. Therefore, the electronic device like the mobile phone may be used as a core device, and a task execution condition of another device (for example, the smartwatch in which the second distributed system is installed) is monitored by using the first distributed system installed in the mobile phone. When the mobile phone detects, by using the first distributed system, that the task execution condition of the smartwatch is met, the smartwatch may be triggered to execute the background task by using the second distributed system.

In this way, because a processing capability of a processor and a memory of the mobile phone are far stronger than those of the smartwatch, the following is less frequent: the second electronic device like the smartwatch struggles to monitor a task execution condition when memory usage and processor usage are high. Therefore, efficiency of executing the background task is improved.

The following describes a distributed system provided in embodiments of this application. In embodiments of this application, the HarmonyOS is used as an example to describe the distributed system provided in embodiments of this application. It may be understood that the distributed system in embodiments of this application is described by taking the HarmonyOS as an example, but is not limited to the HarmonyOS. The distributed system may also include another type of system, for example, an operating system of Apple Inc. (including a mobile phone operating system (iPhone operation system, iOS), MacOS for computers, iPadOS for tablets, etc.), Microsoft systems, and the like. "IOS," "MacOS", and "iPadOS" are trademarks of Apple Inc.

FIG. 1 is a schematic diagram of an architecture of a software system of the HarmonyOS according to an embodiment of this application. As shown in FIG. 1, the system architecture is a hierarchical architecture, in which software is divided into several layers, and each layer has clear roles and task. The layers communicate with each other through a software interface. In some embodiments, the HarmonyOS is divided into four layers: an application layer, an application framework layer, a basic service layer, and a kernel layer from top to bottom.

The following describes the kernel layer, the basic service layer, the program framework layer, and the application layer.

(1) Kernel Layer

In the HarmonyOS, a microkernel may be used at the kernel layer. The microkernel means that an operating platform is used to perform different upper-layer deployments based on the kernel layer to implement different interfaces and functions. For example, as shown in FIG. 1, the kernel layer may include a HarmonyOS microkernel and a lite operating system (lite operating system, LiteOS). Different kernel layers may be used in different types of devices to deploy products with different hardware capabilities. For example, a mobile phone and a vehicle-mounted device serve different purposes. For the mobile phone and the vehicle-mounted device, different interfaces or functions may be deployed on an upper layer based on the kernel layer.

The HarmonyOS microkernel is an all-scenario distributed operating system based on the microkernel. The HarmonyOS microkernel scales on demand, to implement broader system security. The HarmonyOS microkernel can be used in the Internet of Things (IoT) and features low latency. The latency can be as low as milliseconds or even sub-milliseconds.

The HarmonyOS may apply the microkernel to a trusted execution environment (e.g., trusted execution environment (TEE)), to improve kernel security.

The LiteOS is a lightweight IoT operating system designed for the IoT field. It has key capabilities such as lightweight, low power consumption, interoperability, rich components, and fast development. The LiteOS kernel size is 10 KB. The LiteOS may provide a kernel for devices such as a wearable device, a smart home device, an Internet of vehicles device, and a low power wide area network (low power wide area network, LPWAN) device.

(2) Basic Service Layer

The basic service layer may include distributed scheduling and distributed data management. The basic service layer may also include hardware capability virtualization and a distributed soft bus (not shown in the figure). The hardware capability virtualization means shared resources, and the distributed soft bus is used to connect different electronic devices, to share capabilities between the electronic devices.

The following describes the distributed data management and the distributed scheduling.

(a) Distributed Data Management

The distributed data management may be used to synchronize databases between different electronic devices, to implement consistency of the databases on different electronic devices. In the distributed data management, the databases can manage data by using accounts, application IDs, and database IDs. The data may include one or more scheduling features and a system service list. The scheduling features include, for example, a user status, a user profile feature, a device service status, and a device profile.

The user status may be used to indicate whether a user is online or busy.

The user profile feature may be used to outline a requirement and a design direction of a target user. The electronic device may generate a series of labels by using various types of user data in the network, that is, the user profile feature may be used to represent the user profile.

The device service status may include data such as a device running status (for example, memory usage and processor usage), and a frequency of using an application on the device.

The device profile may include device information of a device, for example, a device type (the mobile phone, the smartwatch, or a smart screen), a hardware feature of the device (for example, a size of a display, if the display is included), and the like.

It may be understood that the foregoing device service status and device profile examples are merely used to explain this embodiment of this application, should not constitute a limitation, and may further include other types of data.

The system service list may include a plurality of running system services. Each system service is identified by a service identity (identity, ID).

(b) Distributed Scheduling

The distributed scheduling provides unified distributed service management, including discovering, synchronizing, registering, and invoking background tasks. The distributed scheduling may be used to remotely start, invoke, bind, unbind, and migrate cross-device applications. The distributed scheduling enables the HarmonyOS to select the most appropriate device to run background tasks based on capabilities, locations, service running status, and resource usage of different devices as well as user habits and intentions.

The distributed scheduling includes device scheduling, ability scheduling, scheduling policy optimization, and scheduling policy management.

The distributed scheduling also includes a system ability manager (system ability manager, SAMGR). The SAMGR is an administrator of system services and can register, discover, and synchronize services. The SAMGR may further query and obtain a system ability (system ability, SA), and provide the queried system ability to a client process.

The SAMGR may include service registration, service discovery, dynamic service loading, and service synchronization.

The SAMGR may also include an SA management module. The SAMGR may implement communication between different devices by using a communication module.

(3) Program Framework Layer

The program framework layer provides interfaces for applications at the application layer. In this embodiment of this application, the program framework layer may include a background task triggering and a package management service. The following describes the background task triggering and the package management service.

(a) Background Task Triggering

The background task triggering is used to manage a background task of each application and detect whether an execution condition of the background task of each application is met. The applications include a locally installed application and an application installed in another device. When it is detected that an execution condition of a background task is met, the background task triggering may detect whether the background task needs to be executed. When the background task is to be executed, the background task triggering may notify the application in the application layer to execute the background task.

The background task triggering may include a task queue manager, a task scheduling SA, and a state listener. The following describes the task queue manager, the task scheduling SA, and the state listener.

The task queue manager may be configured to store the background task of each application and a priority of each background task.

The task scheduling SA may include a task scheduler. The task scheduler is configured to determine, based on a state reported by the state listener, whether to execute a background task, and execute corresponding background tasks in sequence based on priorities of background tasks in the queue manager.

The state listener is configured to monitor a task execution condition of each background task. The state listener can include a monitoring condition and a background task list. For example, a task execution condition of a background task may include a processor usage of less than 30%. The detection condition included in the state listener that monitors a status of a processor is whether the processor usage is less than 30%, and the background task list includes the background task. The state listener reports a detected condition and a corresponding task ID to the task queue manager when detecting that the condition is met.

(b) Package Management Service

In this embodiment of this application, the package management service may be used to perform verification on an application before the background task is sent to the application for execution. Specifically, when the application is installed, a first electronic device 10 may perform security verification on the application. The application can be installed in a distributed system only after the security verification succeeds. After the security verification succeeds, the package management service may store verification information of the application. The package management service may verify the application based on the prestored verification information before the background task is sent to the application for execution. Only when the verification succeeds, the task scheduler sends the background task to the application, to execute the background task.

The package management service is also used to manage an application package ID to which each background task belongs. Specifically, the package management service may store a correspondence between an application package name and an application package ID. When the task scheduler needs to execute a background task corresponding to an application, the task scheduler may find a corresponding application package ID from the package management service based on an application package name, and notify, based on the application package ID, a corresponding application to execute the background task.

It may be understood that, in this embodiment of this application, a location of the package management service is not limited to the application framework layer, and may alternatively be the basic service layer. Some functions of the package management service may be implemented by a module in the application framework layer, and some functions may be implemented by a module in the basic service layer.

(3) Application Layer

In this embodiment of this application, the application layer may include a series of application packages. As shown in FIG. 1, the application packages may include various applications. For example, the various applications include but are not limited to at least one of the following: Camera, Gallery, Calendar, Call, Map, Navigation, WLAN, Bluetooth, Music, Video, or Messages. The application packages may also include the Harmony KIT (Harmony KIT).

The Harmony KIT can be used to register a background task. After the registration, the application framework layer can monitor an execution condition of the background task. Specifically, the Harmony KIT may include task scheduling KIT. The task scheduling KIT in the Harmony KIT may receive a background task request from an application. The background task request is used to request to execute a background task of the application. For details, refer to corresponding content in FIG. 6. The background task request carries the execution condition of the background task. The background task may be executed when a corresponding execution condition is met. The Harmony KIT is also used to deliver the background task request to the task scheduling SA at the program framework layer (for example, to the task scheduler in the task scheduling SA). The task scheduling SA may include the task scheduler. The task scheduler may deliver a listening notification to the state listener based on the background task request, and the state listener may perform listening based on the listening notification, and report to the task queue manager when detecting that a condition is met.

The Harmony KIT is further configured to store a background task corresponding to the background task execution request into the task queue manager. The queue manager stores background tasks with different execution priorities.

In this embodiment of this application, based on a device type (the mobile phone, the smartwatch, or the smart screen), a module specific to the device type may be set in a distributed system installed in an electronic device.

For example, a kernel layer of the mobile phone may include the Harmony microkernel. The Harmony microkernel scales as the mobile phone needs, to implement broader system security. For the mobile phone, a basic service layer may further include a UI module adapted to an interface of the mobile phone, so that a displayed user interface adapts to a screen of the mobile phone. The UI module may be further configured to adapt a user interface of another device (for example, the smartwatch) to the screen of the mobile phone. In this embodiment of this application, a first electronic device may be the mobile phone, and a distributed system installed in the first electronic device may be a first distributed system.

For another example, for the device like the smartwatch or the band, a kernel layer may include a LiteOS, and a basic service layer may include a graphical user interface (user interface, UI) module adapted to an interface of the smartwatch or the band, so that the displayed user interface adapts to a screen of the smartwatch or the band.

For another example, for an Internet of things device (including smart home devices such as a smart speaker, a smart camera, and a smart screen, and vehicle-mounted devices such as a heat unit), a basic service layer may further include a dedicated service of the IoT device. The dedicated service of the IoT device can be used to provide an IoT service and provide secure and reliable device connection and communication capabilities. An application at the application layer may send data to another device by invoking an API provided by the dedicated service of the IoT device, to implement data transmission.

In this embodiment of this application, a second electronic device may be the smartwatch, the band, the Internet of things device, or the like, and a distributed system installed in the second electronic device may be the second distributed system.

Figure 2:
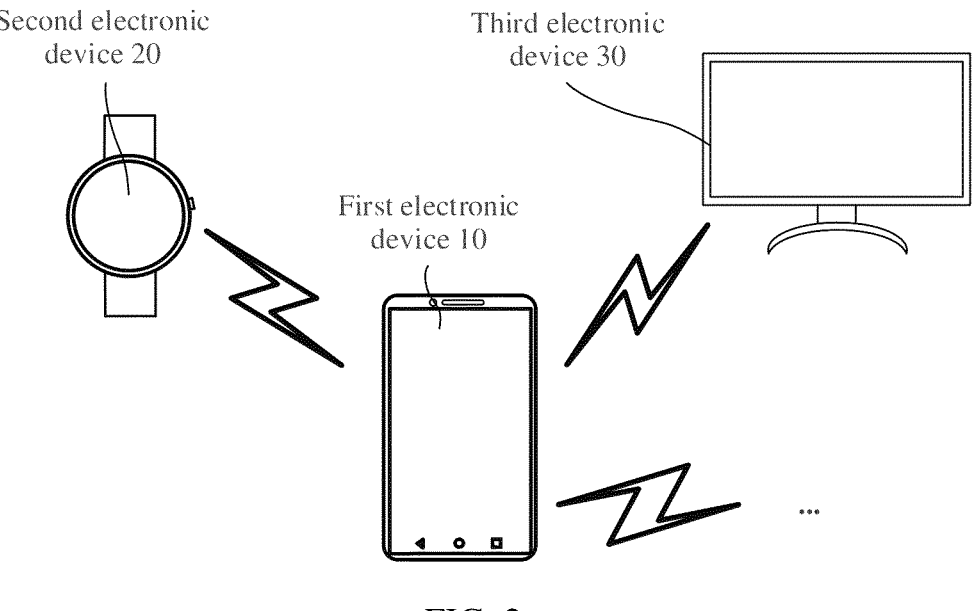
FIG. 2 is a schematic diagram of an architecture of a hardware system according to an embodiment of this application.

Based on the architecture of the software system described in FIG. 1, the following describes an architecture of a hardware system provided in an embodiment of this application. FIG. 2 is a schematic diagram of an architecture of a hardware system according to an embodiment of this application. As shown in FIG. 2, the hardware system may include a first electronic device 10 and an electronic device that establishes a communication connection to the first electronic device 10. The electronic device that establishes the communication connection to the first electronic device 10 includes, for example, a second electronic device 20 and a third electronic device 30.

The first electronic device 10 may be a device like a mobile phone or a tablet. A processing capability of a processor and a memory of the first electronic device 10 are stronger than those of the second electronic device 20 and the third electronic device 30. The second electronic device 20 and the third electronic device 30 each may be a wearable device (for example, a smartwatch, a smart band, or a pair of smart glasses), a smart home device (for example, a smart screen, a smart speaker, or a smart weighing scale), a virtual reality device, an augmented reality device, or the like.

The first electronic device 10 may separately establish a communication connection to the second electronic device 20 and the third electronic device 30. The communication connection may be a short-range wireless communication connection (for example, a Wi-Fi connection or a Bluetooth connection), a mobile network connection (for example, a connection established by using a cellular mobile communication technology such as a third generation mobile communication technology (3rd generation, 3G), a long term evolution (long term evolution, LTE), or a fifth generation mobile communication technology (5th generation wireless systems, 5G), or a wide area network (wide area network, WAN) technology), or the like. A type of the connection between the first electronic device 10 and the second electronic device 20 is not limited in this embodiment of this application.

In this embodiment of this application, the first electronic device 10 may be used as a core device, and monitor a task execution condition of another device (for example, the second electronic device 20 and the third electronic device 30) by using a distributed system installed in the first electronic device 10. When the first electronic device 10 detects, by using the distributed system, that the task execution condition of the second electronic device 20 is met, the first electronic device 10 may trigger, by using the communication connection to the second electronic device 20, the second electronic device 20 to execute a task. In this way, because the processing capability of the processor and the memory of the first electronic device 10 are far stronger than those of the second electronic device 20, the following is less frequent: the second electronic device 20 struggles to monitor a task execution condition when memory usage and processor usage are high. Therefore, efficiency of executing a task is improved. Similarly, when the first electronic device 10 detects, by using the distributed system, that the task execution condition of the third electronic device 30 is met, the first electronic device 10 may trigger, by using the communication connection to the third electronic device 30, the third electronic device 30 to execute a background task.

It may be understood that, in this embodiment of this application, the second electronic device 20 and the third electronic device 30 are used as examples for description. The electronic device that establishes the communication connection to the first electronic device 10 is not limited to the second electronic device 20 and the third electronic device 30, and may include another electronic device. This is not limited in this embodiment of this application.

The following describes schematic diagrams of structures of the first electronic device 10 and the second electronic device 20 according to an embodiment of this application.

Figure 3:
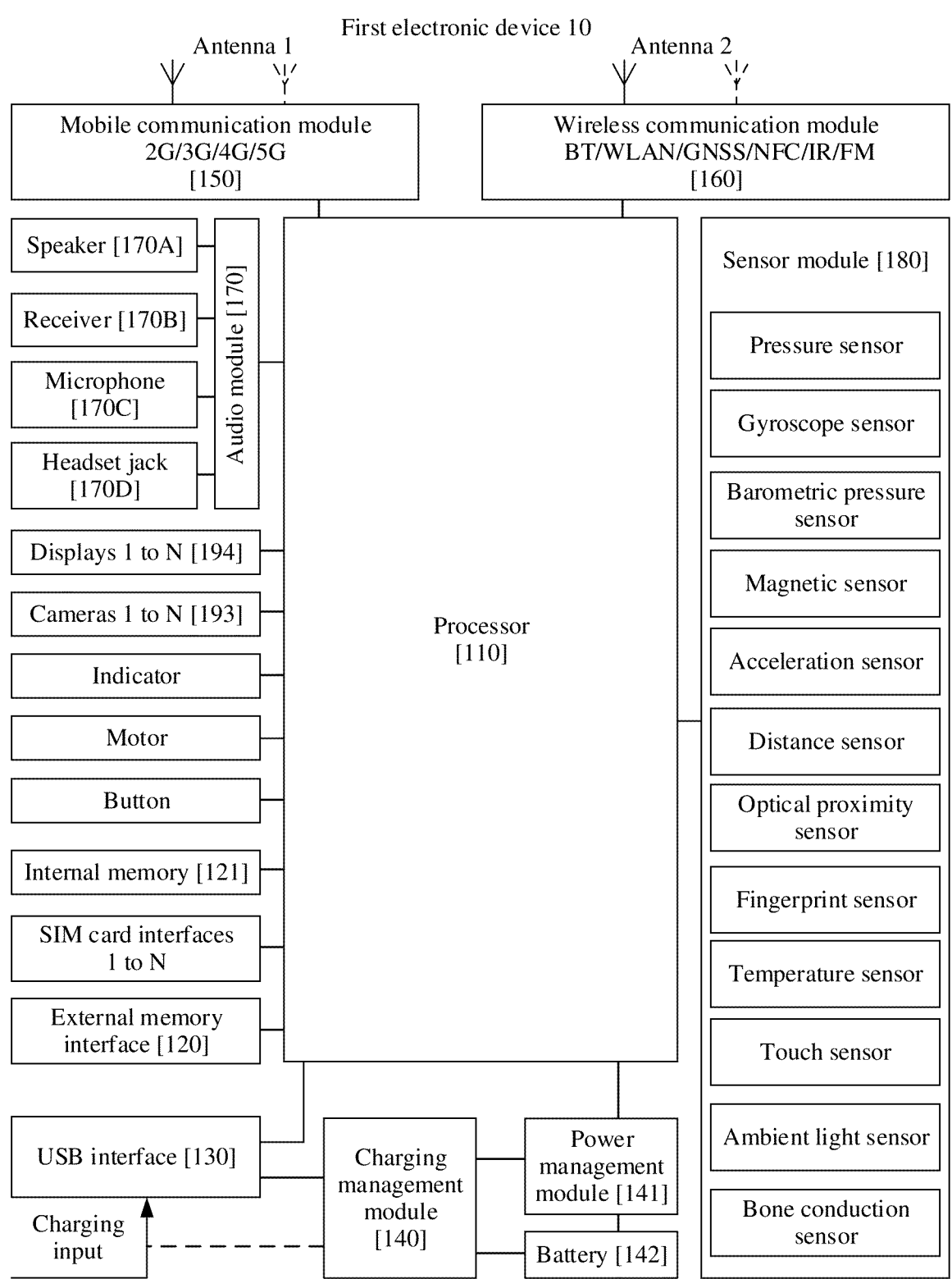
FIG. 3 is a schematic diagram of a structure of a first electronic device 10 according to an embodiment of this application.

FIG. 3 is a schematic diagram of a structure of the first electronic device 10 according to an embodiment of this application. It should be understood that the first electronic device 10 shown in FIG. 1 is merely an example, and the first electronic device 10 may include more or fewer components than those shown in FIG. 1, may combine two or more components, or may have different component configurations. The components shown in the figure may be implemented in hardware including one or more signal processing and/or application-specific integrated circuits, software, or a combination of hardware and software.

The first electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the first electronic device 10. In some other embodiments of this application, the first electronic device 10 may include more or fewer components than those shown in the figure, or combine some components, or split some components, or have different component arrangements. The components shown in the figure may be implemented by hardware, software, or a combination of software and hardware.

The processor (central processing unit, CPU) 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the first electronic device 10. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDL) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the first electronic device 10.

The I2S interface may be configured to perform audio communication. In some embodiments, the processor 110 may include a plurality of groups of I2S buses. The processor no may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the first electronic device 10. The processor 110 communicates with the display 194 via the DSI, to implement a display function of the first electronic device 10.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB t e-C interface, or the like. The USB interface 130 may be configured to connect to a charger to charge the first electronic device 10, or may be configured to transmit data between the first electronic device 10 and a peripheral device, or may be configured to connect to a headset for playing audio through the headset. The interface may be further configured to connect to another electronic device like an AR device.

It may be understood that an interface connection relationship between the modules that is shown in this embodiment of the present invention is merely an example for description, and does not constitute a limitation on the structure of the first electronic device 10. In some other embodiments of this application, the first electronic device 10 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the first electronic device 10. The charging management module 140 may supply power to the electronic device through the power management module 141 while charging the battery 142.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the first electronic device 10 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the first electronic device 10 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the first electronic device 10 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as a mobile communication module 150 or another functional module.

The wireless communication module 160 may provide a wireless communication solution that is applied to the first electronic device 10 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

The communication module in this embodiment of this application may be implemented by using the wireless communication module 160. The first electronic device 10 may establish a wireless connection to another electronic device (for example, the second electronic device 20) by using the wireless communication module 160. The first electronic device 10 and the second electronic device 20 may transmit data by using the wireless connection, for example, perform data synchronization with a distributed data management by using the wireless connection.

For another example, the second electronic device 20 may transmit a background task request to the first electronic device 10 by using the wireless connection. The first electronic device 10 may monitor a task execution condition based on the background task request. When it is detected that the task execution condition is met, the first electronic device 10 further sends, to the second electronic device 20 by using the wireless connection, a notification used to execute a background task.

In some embodiments, in the first electronic device 10, the antenna 1 and the mobile communication module 150 are coupled, and the antenna 2 and the wireless communication module 160 are coupled, so that the first electronic device 10 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device 10 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the first electronic device 10 may include one or N displays 194, where N is a positive integer greater than 1.

The first electronic device 10 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the first electronic device 10 may include one or N cameras 193, where N is a positive integer greater than 1.

The digital signal processor is configured to process a digital signal, and may process another digital signal in addition to the digital image signal. For example, when the first electronic device 10 selects a frequency, the digital signal processor is configured to perform Fourier transform on frequency energy.

The video codec is configured to compress or decompress a digital video. The first electronic device 10 may support one or more video codecs. In this way, the first electronic device 10 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the first electronic device 10, for example, image recognition, facial recognition, speech recognition, and text understanding.

The external memory interface 120 may be configured to connect to an external storage card, for example, a micro-SD card, to extend a storage capability of the first electronic device 10. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the first electronic device 10 and data processing. The internal memory 121 may include a program storage area and a data storage area. The program storage area may store an operating system, an application required by at least one function (for example, a voice playing function or an image playing function), and the like. The data storage area may store data (for example, audio data and an address book) and the like created when the first electronic device 10 is used. In addition, the internal memory 121 may include a high-speed random access memory, or may include a nonvolatile memory, for example, at least one magnetic disk storage device, a flash memory, or a universal flash storage (universal flash storage, UFS). The internal memory 121 may be a memory in this embodiment of this application.

The first electronic device 10 may implement audio functions such as music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The first electronic device 10 may be configured to listen to music or answer a call in a hands-free mode by using the speaker 170A.

The receiver 170B, also referred to as an "earpiece", is configured to convert an audio electrical signal into a sound signal. When a call is answered or voice information is received by using the first electronic device 10, the receiver 170B may be put close to a human ear to receive a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the first electronic device 10. In some other embodiments, two microphones 170C may be disposed in the first electronic device 10, to collect a sound signal and implement a noise reduction function. In some other embodiments, three, four, or more microphones 170C may alternatively be disposed in the first electronic device 10, to collect a sound signal, implement noise reduction, recognize a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The first electronic device 10 determines pressure intensity based on a capacitance change. When a touch operation is performed on the display 194, the first electronic device 10 detects intensity of the touch operation by using the pressure sensor 180A. The first electronic device 10 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyroscope sensor 180B may be configured to determine a moving posture of the first electronic device 10. In some embodiments, an angular velocity of the first electronic device 10 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the first electronic device 10 jitters, calculates, based on the angle, a distance for which a lens module needs to compensate, and allows the lens to cancel the jitter of the first electronic device 10 through reverse motion, to implement image stabilization. The gyroscope sensor 180B may also be used in a navigation scenario and a somatic game scenario.

The barometric pressure sensor 180C is configured to measure barometric pressure. In some embodiments, the first electronic device 10 calculates an altitude through the barometric pressure measured by the barometric pressure sensor 180C, to assist in positioning and navigation.

The magnetic sensor 180D includes a Hall effect sensor. The first electronic device 10 may detect opening and closing of a flip cover by using the magnetic sensor 180D. In some embodiments, when the first electronic device 10 is a clamshell phone, the first electronic device 10 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the first electronic device 10. When the first electronic device 10 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The first electronic device 10 may measure the distance in an infrared manner or a laser manner. In some embodiments, in a photographing scenario, the first electronic device 10 may measure a distance by using the distance sensor 180F to implement quick focusing.

The optical proximity sensor 180G may include, for example, a light-emitting diode (LED) and a light detector such as a photodiode. The light emitting diode may be an infrared light emitting diode. The first electronic device 10 emits infrared light by using the light-emitting diode. The first electronic device 10 detects infrared reflected light from a nearby object by using the photodiode. When sufficient reflected light is detected, the first electronic device 10 may determine that there is an object near the first electronic device 10. When insufficient reflected light is detected, the first electronic device 10 may determine that there is no object near the first electronic device 10. The first electronic device 10 may detect, by using the optical proximity sensor 180G, that the user holds the first electronic device 10 close to an ear for a call, to automatically turn off a screen for power saving. The optical proximity sensor 180G may also be used for automatic screen unlocking and locking in a smart cover mode or a pocket mode.

The ambient light sensor 180L is configured to sense ambient light brightness. The first electronic device 10 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the first electronic device 10 is in a pocket, to avoid an accidental touch.

The fingerprint sensor 180H is configured to collect a fingerprint. The first electronic device 10 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the first electronic device 10 executes a temperature processing policy through the temperature detected by the temperature sensor 180J. For example, when the temperature reported by the temperature sensor 180J exceeds a threshold, the first electronic device 10 degrades performance of a processor near the temperature sensor 180J, to reduce power consumption for thermal protection. In some other embodiments, when the temperature is less than another threshold, the first electronic device 10 heats the battery 142 to prevent the first electronic device 10 from being powered off abnormally due to a low temperature. In some other embodiments, when the temperature is less than still another threshold, the first electronic device 10 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. The display 194 may provide a visual output related to the touch operation. In some other embodiments, the touch sensor 180K may also be disposed on a surface of the first electronic device 10 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, may be a touch key. The first electronic device 10 may receive a button input, and generate a button signal input related to user setting and function control of the first electronic device 10.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the first electronic device 10. The first electronic device 10 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The first electronic device 10 interacts with a network by using the SIM card, to implement functions such as conversation and data communication. In some embodiments, the first electronic device 10 uses an eSIM, namely, an embedded SIM card. The eSIM card may be embedded into the first electronic device 10, and cannot be separated from the first electronic device 10.

Figure 4:
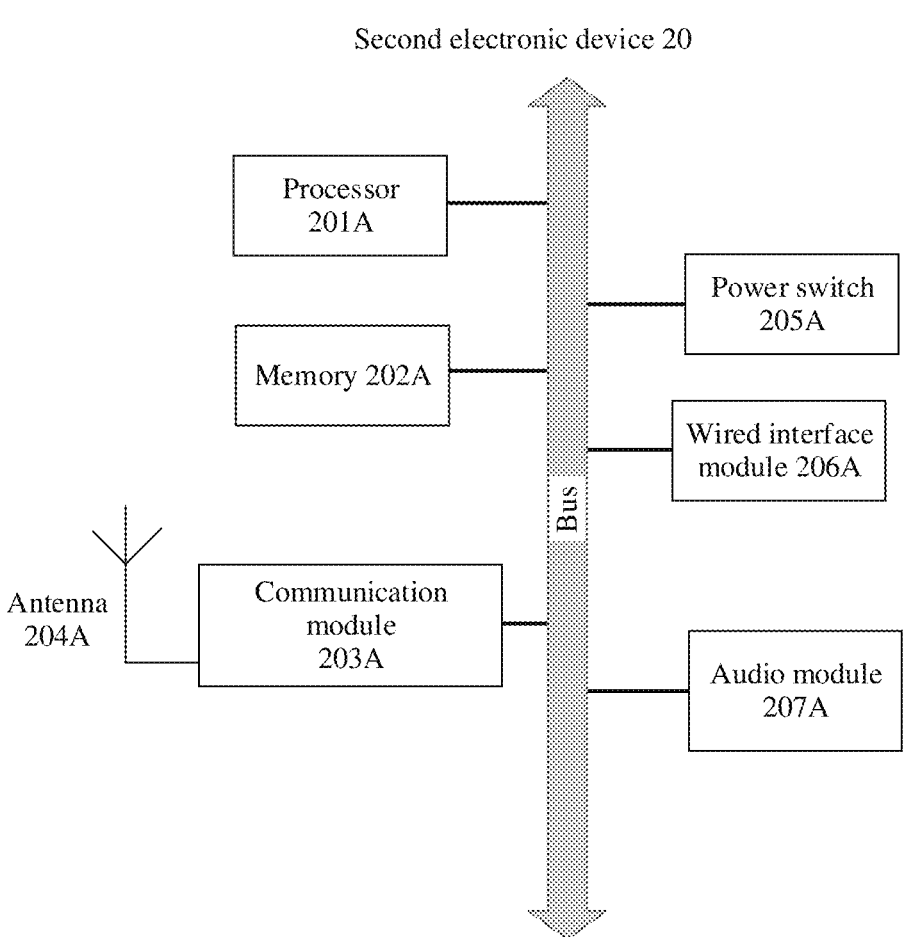
FIG. 4 is a schematic diagram of a structure of a second electronic device 20 according to an embodiment of this application.

FIG. 4 is a schematic diagram of a structure of the second electronic device 20 according to an embodiment of this application. The second electronic device 20 may be a smartwatch The following describes the second electronic device 20 in detail. It should be understood that the second electronic device 20 shown in FIG. 4 is merely an example, and the second electronic device 20 may include more or fewer components than those shown in FIG. 4, may combine two or more components, or may have different component configurations. The components shown in the figure may be implemented in hardware including one or more signal processing and/or application-specific integrated circuits, software, or a combination of hardware and software.

As shown in FIG. 4, the second electronic device 20 may include a processor 201A, a memory 202A, a communication module 203A, an antenna 204A, a power switch 205A, a wired interface module 206A, and an audio module 207A.

The processor 201A may be configured to read and execute computer-readable instructions. In specific implementation, the processor 201A may mainly include a controller, an arithmetic unit, and a register. The controller is mainly responsible for decoding instructions and sending a control signal for an operation corresponding to the instructions. The arithmetic unit is mainly responsible for storing a register operand, an intermediate operation result, and the like that are temporarily stored during instruction execution. In specific implementation, a hardware architecture of the processor 201A may be an application-specific integrated circuit (ASIC) architecture, an MIPS architecture, an ARM architecture, an NP architecture, or the like.

In some embodiments, the processor 201A may be configured to parse a signal received by the communication processing module 203A, for example, a data synchronization request sent by the first electronic device 100 and a notification used to execute a background task. The processor 201A may be configured to perform a processing operation based on a parsing result, for example, perform data synchronization with the first electronic device 10 based on a data synchronization request. For another example, the processor 201A may execute the background task by using an application according to the notification used to execute the background task.

The memory 202A is coupled to the processor 201A, and is configured to store various software programs and/or a plurality of sets of instructions. In specific implementation, the memory 202A may include a high-speed random access memory, and may further include a nonvolatile memory, such as one or more magnetic disk storage devices, a flash memory device, or another nonvolatile solid-state storage device. The memory 202A may store an operating system, for example, a distributed operating system such as the HarmonyOS. The memory 202A may further store a communication program, and the communication program may be used to communicate with the first electronic device 10 or another device. The processor 201A may be a processor in this embodiment of this application.

In this embodiment of this application, the memory 202A may include an external memory interface (which may be configured to connect to an external storage card, for example, a micro SD card, to expand a storage capability of the first electronic device 10) and an internal memory (which may be configured to store computer-executable program code, including instructions). The external storage card communicates with the processor 201A through the external memory interface, to implement a data storage function. For example, files such as music and videos are stored in the external storage card. The processor 201A runs the instructions stored in the internal memory, to perform various function applications of the second electronic device 20 and data processing. The internal memory may include a program storage area and a data storage area. The internal memory is a memory in this embodiment of this application.

The communication module 203A may provide a wireless communication solution that is applied to the second electronic device 20 and that includes a WLAN (for example, a Wi-Fi network), a BR/EDR, BLE, a GNSS, FM, or the like. In some embodiments, the communication module 203A may establish a wireless connection to another device (for example, the first electronic device 10), and may communicate with the another device (for example, the first electronic device 10) by using the wireless connection, for example, receive a data synchronization request sent by the first electronic device 100, a notification used to execute a background task, and the like. For another example, the second electronic device 20 may send a background task request to the first electronic device 10 by using the communication module 203A.

A wireless communication function of the second electronic device 20 may be implemented through the antenna 204A, the communication module 203A, the modem processor, and the like.

The antenna 204A may be configured to transmit and receive electromagnetic wave signals. Each antenna in the second electronic device 20 may be configured to cover one or more communication frequency bands.

In some embodiments, the communication module 203A may have one or more antennas.

The power switch 205A may be configured to control a power supply to supply power to the second electronic device 20.

The wired interface module 206A may be configured to communicate with another device through a wired interface (not shown).

The audio module 207A may be configured to output an audio signal through an audio output interface. The audio module may be further configured to receive audio data through an audio input interface.

The second electronic device 20 is not limited to a smartwatch. In some embodiments, the second electronic device 20 may alternatively be a tablet computer, a smart television, or the like. The second electronic device 20 may further include a display (not shown). The display may be configured to display an image, prompt information, and the like. The display may be a liquid crystal display (liquid crystal display, LCD), an organic light-emitting diode (organic light-emitting diode, OLED) display, an active-matrix organic light-emitting diode (active-matrix organic light-emitting diode, AMOLED) display, a flexible light-emitting diode (flexible light-emitting diode, FLED) display, a quantum dot light-emitting diode (quantum dot light-emitting diodes, QLED) display, or the like.

Alternatively, when the second electronic device 20 may be a tablet computer, a smart television, or the like, in some embodiments, the second electronic device 20 may further include a serial interface such as an RS-232 interface. The serial interface may be connected to another device, for example, an audio speaker device like a smart speaker, so that the second electronic device 20 collaborates with the audio speaker device to play audio and a video.

It may be understood that the structure shown in FIG. 4 does not constitute a specific limitation on the second electronic device 20. In some other embodiments of this application, the second electronic device 20 may include more or fewer components than those shown in the figure, or combine some components, or split some components, or have different component arrangements. The components shown in the figure may be implemented by hardware, software, or a combination of software and hardware.

In embodiments of this application, for a schematic diagram of a structure of the third electronic device 30, refer to the descriptions of the schematic diagram of the structure of the second electronic device 20 shown in FIG. 4, and the third electronic device 30 includes more or fewer components than those described in FIG. 4. Details are not described herein again.

With reference to the architecture of the software system and the architecture of the hardware system, the following describes a process in which the first electronic device 10 monitors a task execution condition of an application on the second electronic device 20, and triggers the second electronic device 20 to execute a background task in this embodiment of this application.

Figure 5:
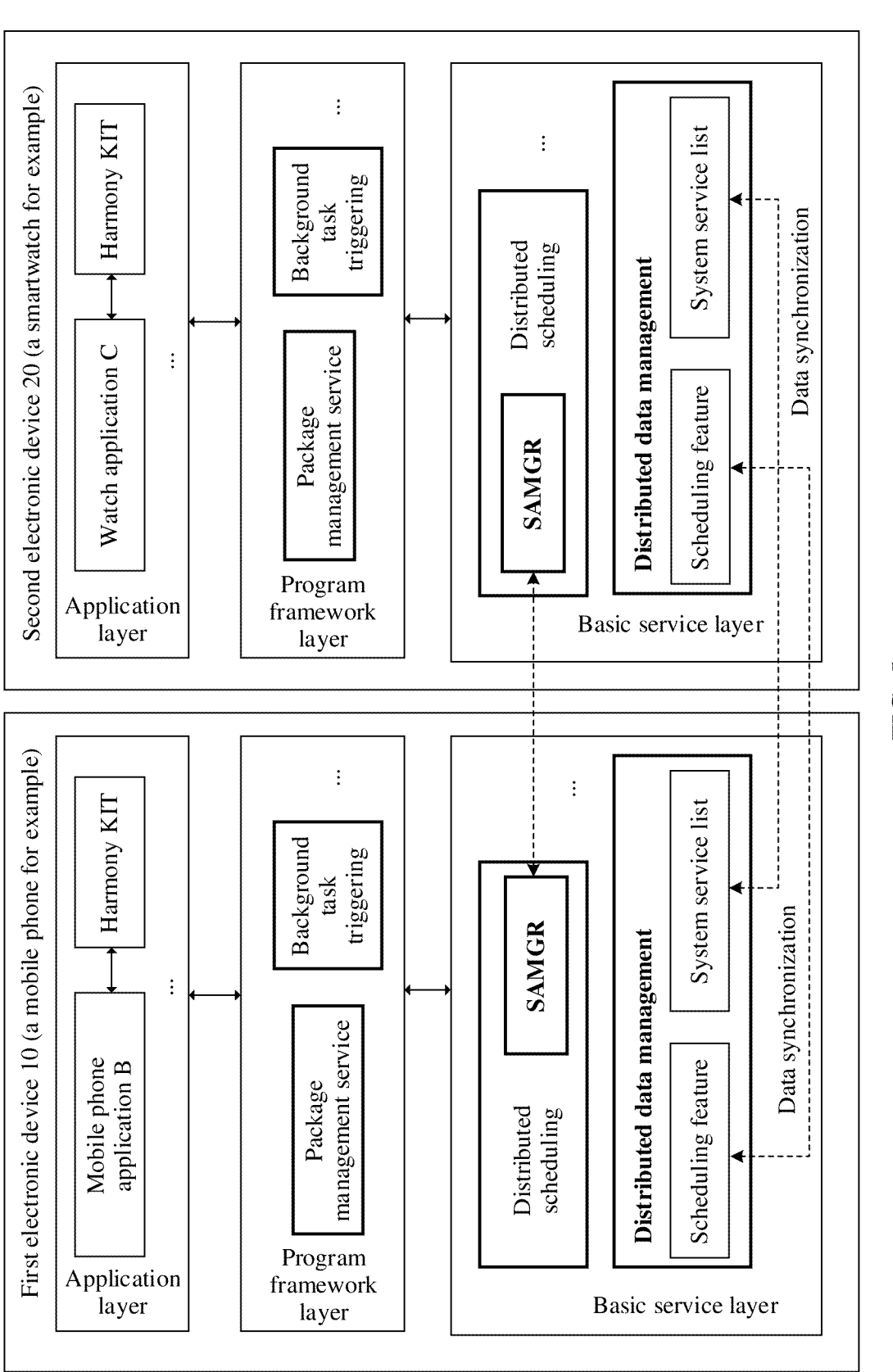
FIG. 5 is a schematic diagram of an architecture of a software system according to an embodiment of this application.

FIG. 5 is a schematic diagram of an architecture of a software system according to an embodiment of this application. As shown in FIG. 5, a distributed system is installed in both the first electronic device 10 and the second electronic device 20. Specifically, the first electronic device may be the mobile phone, and the distributed system installed in the first electronic device may be the first distributed system. The second electronic device may be a smartwatch, and the distributed system installed in the second electronic device may be a second distributed system. The first electronic device 10 may monitor a task execution condition of a local application by using the first distributed system, and trigger, by using the first distributed system, the local application to execute a background task. The first electronic device 10 may further monitor a task execution condition of an application on the second electronic device 20 by using the first distributed system, and trigger, by using the first distributed system, the application on the second electronic device 20 to execute a background task. The following describes the two processes with reference to FIG. 5.

(A) the First Electronic Device 10 Triggers, by Using the First Distributed System, the Local Application to Execute a Background Task.

As shown in FIG. 5, in the first electronic device 10, an application layer may include a mobile phone application B. The mobile phone application B may generate a background task. For example, the mobile phone application B needs to periodically synchronize data. When a periodic data synchronization function is enabled, the mobile phone application B may generate the background task. When the mobile phone application B generates the background task, the mobile phone application B sends a background task request to a background task triggering by using the Harmony KIT. The background task request corresponds to the background task of the mobile phone application B. The background task request may carry an execution condition of the background task. For details about the background task triggering, refer to corresponding descriptions in FIG. 1.

After receiving the background task request, the background task triggering in the first electronic device 10 starts to monitor a trigger condition of the background task of the mobile phone application B. When the first electronic device 10 detects, by using the background task triggering, that the trigger condition of the background task is met, the background task triggering may detect whether the execution condition of the background task in the mobile phone application B is currently met. For example, the background task triggering may detect whether processor usage is currently less than a specified threshold. If the processor usage is currently less than the specified threshold, the background task triggering notifies the mobile phone application B to execute the background task.

(B) The First Electronic Device 10 Triggers, by Using the First Distributed System, the Application on the Second Electronic Device 20 to Execute a Background Task.

The second electronic device 20 is, for example, the smartwatch. In the second electronic device 20, an application layer may include a watch application C. The watch application C may also generate a background task. When the watch application C generates the background task, the watch application C sends a background task request to a background task triggering in the second electronic device 20 by using the Harmony KIT of the second electronic device 20. The background task request corresponds to the background task of the watch application C. The background task request may carry an execution condition of the background task.

After receiving the background task request, the background task triggering in the second electronic device 20 sends the background task request to distributed scheduling at a basic service layer of the second electronic device 20. A SAMGR in the distributed scheduling of the second electronic device 20 may transmit the background task request to a SAMGR in the first electronic device 10 by using a communication module. The communication module is, for example, a Wi-Fi module or a Bluetooth module. The first electronic device 10 may establish a communication connection to the second electronic device 20 by using a communication module. The SAMGR in the first electronic device 10 may transmit the background task request of the watch application C to a background task triggering in the first electronic device 10.

After the background task request of the watch application C on the second electronic device 20 is received, the background task triggering in the first electronic device 10 starts to monitor a trigger condition of the background task of the watch application C on the second electronic device 10.

A distributed data management of the first electronic device 10 and a distributed data management of the second electronic device 20 may be synchronized by using the communication modules. Specifically, one or more scheduling features perform data synchronization by using the communication modules of the two devices. Synchronized data may include a user status, a user profile feature, a device service status, a device profile, and the like. System service lists can be synchronized through the communication modules of the two devices. Synchronized data may include background service data.

When the first electronic device 10 detects, by using the background task triggering in the first electronic device 10, that the trigger condition of the background task of the watch application C on the second electronic device 20 is met, the background task triggering in the first electronic device 10 may obtain, by using the distributed data management of the first electronic device 10, whether the watch application C on the second electronic device 20 is in a running state. If such device is in a running state, the background task triggering in the first electronic device 10 notifies the SAMGR in the first electronic device 10. The SAMGR in the first electronic device 10 sends a notification to the SAMGR in the second electronic device 20 by using the communication module of the first electronic device 10, to notify the watch application C on the second electronic device 20 to execute the background task. The SAMGR in the second electronic device 20 sends the notification to the watch application C by using the background task triggering at a program framework layer. After receiving the notification, the watch application C executes the background task.

Based on the distributed systems described in FIG. 5, the following describes: (1) a process in which the first electronic device 10 monitors the execution condition of the background task of the local mobile phone application B on the first electronic device 10, and executes the background task of the local mobile phone application B; and (2) a process in which the first electronic device 10 monitors the execution condition of the background task of the watch application C on the second electronic device 20, and triggers the watch application C to execute the background task.

Figure 6:
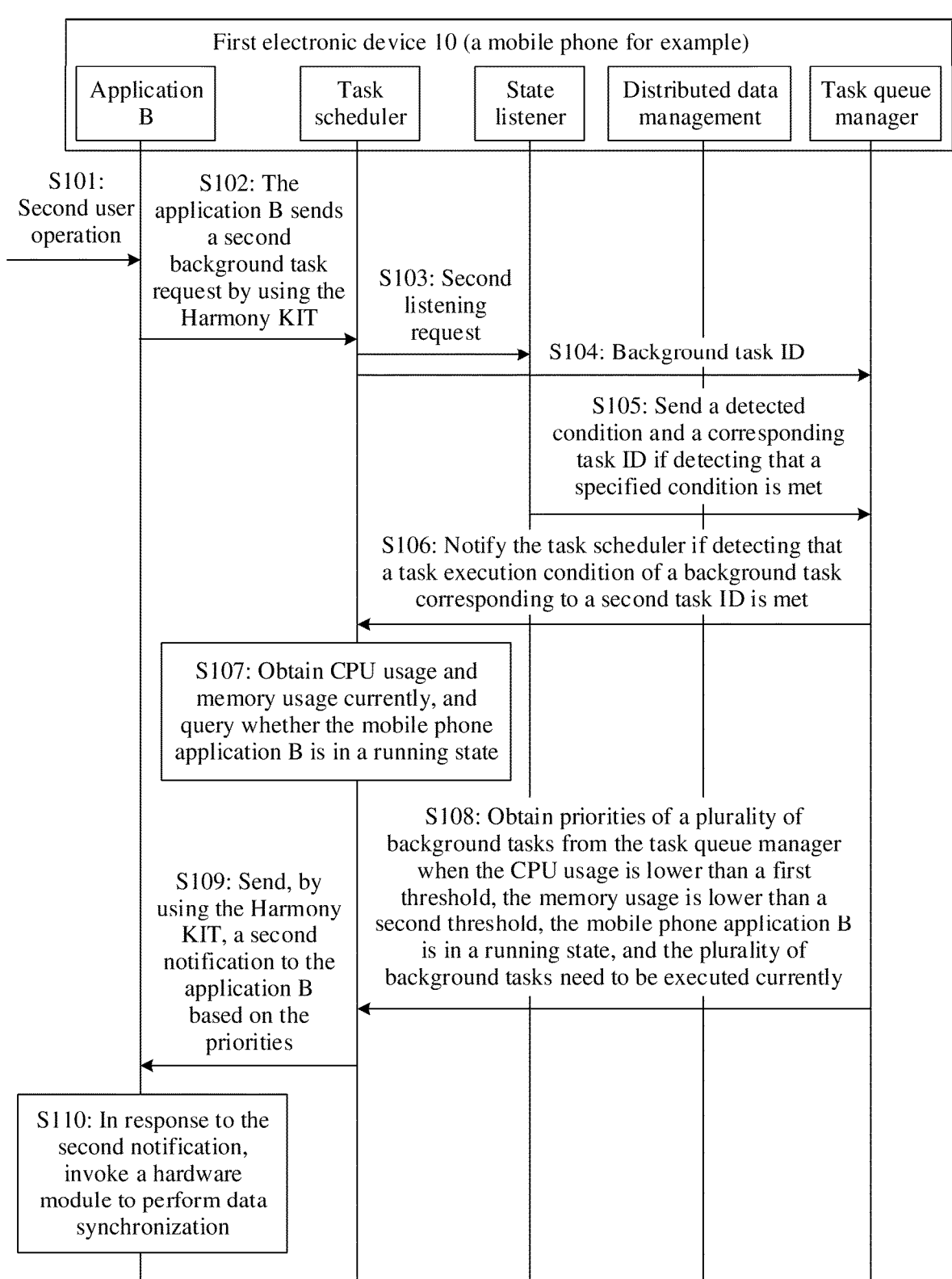
FIG. 6 is a schematic flowchart of a background task execution method according to an embodiment of this application.

(1) The Process in which the First Electronic Device 10 Monitors the Execution Condition of the Background Task of the Local Mobile Phone Application B on the First Electronic Device 10 by Using the First Distributed System, and Executes the Background Task of the Local Mobile Phone Application B The following uses an example in which the background task of the mobile phone application B on the first electronic device 10 is data synchronization for description. FIG. 6 is a schematic flowchart of a background task execution method according to an embodiment of this application. The background task execution method may include steps S101 to S110.

S101: The first electronic device 10 receives a second user operation by using the mobile phone application B on the first electronic device 10. The second user operation is used by the mobile phone application B to generate a second background task. The second background task is a background task of data synchronization on the mobile phone.

Figure 7A:
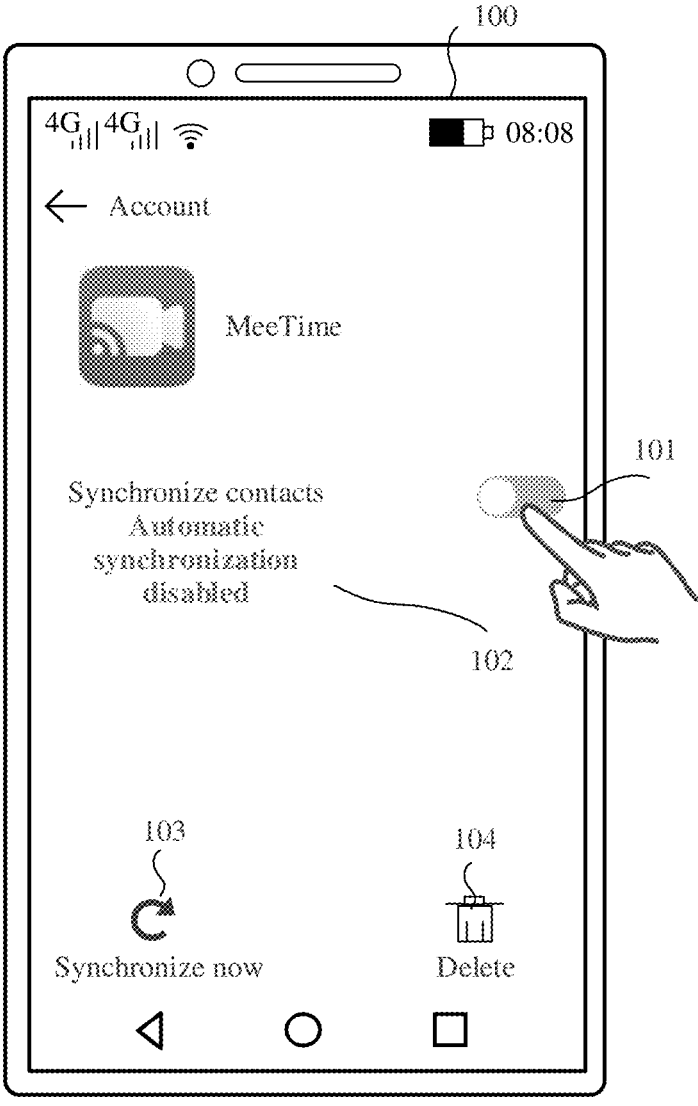
FIG. 7A to FIG. 7C are schematic diagrams of a user interface according to an embodiment of this application.
Figure 7B:
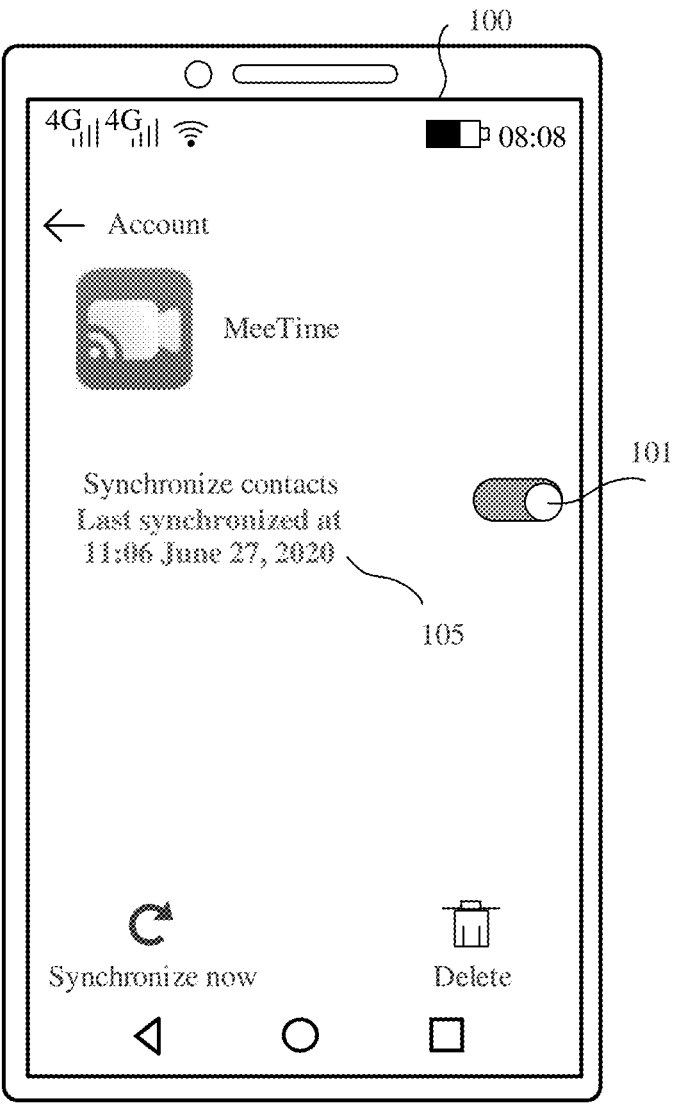
Figure 7C:
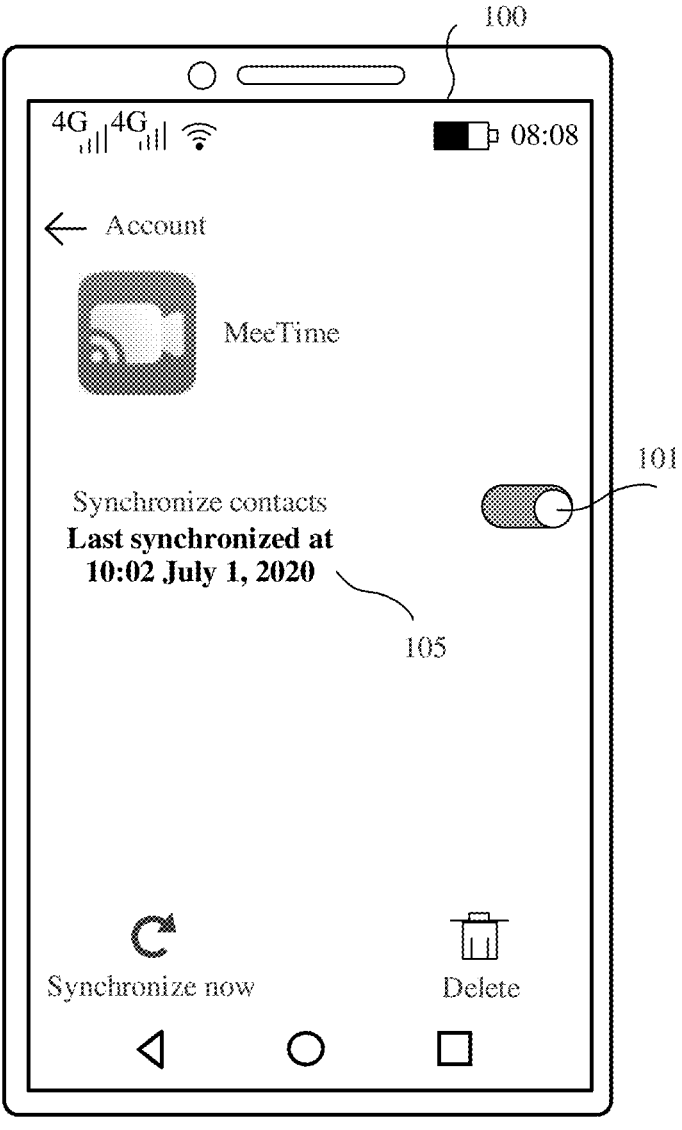

For example, the mobile phone application B may be a contact application, and the background task of data synchronization may be a background task of synchronizing MeeTime contacts. FIG. 7A to FIG. 7C are schematic diagrams of a user interface according to an embodiment of this application. As shown in FIG. 7A, the user interface 100 is a setting interface of the contact application. The user interface 100 includes a synchronization control 101, a prompt 102, a "Synchronize now" control 103, and a "Delete" control 104.

The synchronization control 101 is configured to set automatic synchronization of contact information. The synchronization control 101 may include an off state and an on state. As shown in FIG. 7A, the synchronization control 101 is displayed in an off state. In the off state, the user interface 101 includes the prompt 102, indicating "Automatic synchronization disabled".

The "Synchronize now" control 103 is configured to synchronize contact information with a cloud server or another electronic device. In response to a user operation performed on the "Synchronize now" control 103, the first electronic device 10 synchronizes contact information to a cloud server or another electronic device regardless of processor usage and memory usage of the first electronic device 10 at this time.

The "Delete" control 104 is configured to delete a Mee-Time account in the contact application and contact information under the account. This account is used to synchronize contact information with the cloud server or the another electronic device.

The second user operation may be a user operation performed on the synchronization control 101. In response to the user operation performed on the synchronization control 101, the contact application on the first electronic device 10 may perform step S102 to send a second background task request to the background task triggering.

S102: The mobile phone application B on the first electronic device 10 sends the second background task request to a task scheduling SA of the first electronic device 10 by using the Harmony KIT. It should be understood that, in this specification, "the mobile phone application B on the first electronic device 10 sends, by using the Harmony KIT, the second background task request to a task scheduler included in the task scheduling SA of the mobile phone device 10" is used as an example for description. However, this does not constitute a limitation on this application.

The second background task request may carry a task execution condition, a task ID, and an application executing the task. The second background task request may be used to request to synchronize contact information associated with a MeeTime account. The task execution condition may include: 1. Remaining power of the first electronic device 10 is greater than 30%. 2. The first electronic device 10 successfully accesses Wi-Fi, and may access a mobile communication network through Wi-Fi. The task ID uniquely identifies the background task. The application executing the task may be indicated by using an application package name. The application may be a contact application.

As shown in FIG. 7A and FIG. 7B, in response to a user operation performed on the synchronization control 101, the first electronic device 10 may display a state of the synchronization control 101 as an on state. In the on state, a background task triggering in the first electronic device 10 may detect whether an execution condition of the background task of data synchronization is met.

As shown in FIG. 7B, when the state of the synchronization control 101 is displayed as the on state, the user interface 10 may further include a prompt 105. The prompt 105 indicates last data synchronization time, for example, "Last synchronized at 11:06 Jun. 27, 2020". In this embodiment of this application, in response to the user operation performed on the synchronization control 101 shown in FIG. 7A, the mobile phone application B on the first electronic device 10 may perform data synchronization, record, and display, in the prompt 105, system time of current data synchronization. For example, the system time of current data synchronization is 11:06 Jun. 27, 2020.

A second application in this embodiment of this application is the mobile phone application B.

S103: The task scheduler of the first electronic device 10 sends a second listening request to a state listener of the first electronic device 10 based on the second background task request.

The task scheduler included in the task scheduling SA of the first electronic device 10 may deliver a listening request to each corresponding state listener of the task scheduler.

According to the first task execution condition, when the remaining power of the first electronic device 10 is greater than 30%, the task scheduler of the first electronic device 10 may send a listening request to a state listener A that monitors remaining battery power. The listening request may be used to request the state listener A to detect whether the remaining power of the first electronic device 10 is greater than 30%. The listening request may further carry a background task ID (the background task of data synchronization). When detecting that the remaining power of the first electronic device 10 is greater than 30%, the state listener A of the first electronic device 10 may send a notification to a task queue manager of the first electronic device 10. The notification indicates that the remaining battery power meets a condition of a background task corresponding to the background task ID: The remaining power is greater than 30%.

According to the second task execution condition, when the first electronic device 10 successfully accesses Wi-Fi and may access the mobile communication network through Wi-Fi, the task scheduler of the first electronic device 10 may send a listening request to a state listener B that monitors a Wi-Fi connection status. The listening request may be used to request the state listener B to detect whether the first electronic device 10 accesses Wi-Fi, and whether Wi-Fi is available if the first electronic device 10 accesses Wi-Fi. The listening request may further carry a background task ID (the background task of data synchronization). When detecting that the state listener B successfully accesses Wi-Fi and can access the mobile communication network through Wi-Fi, the state listener B of the first electronic device 10 may send a notification to the task queue manager of the first electronic device 10. The notification indicates that a Wi-Fi connection meets a condition of a background task corresponding to the background task ID: successfully accessing Wi-Fi and being able to access a mobile communication network through Wi-Fi.

In this embodiment of this application, the state listener A and the state listener B of the first electronic device may monitor the execution condition of the background task of data synchronization, and may also monitor an execution condition of another background task. For example, if the execution condition of the another background task includes a requirement for remaining battery power, the task scheduler of the first electronic device 10 may deliver a listening request to the state listener A of the first electronic device 10. Similarly, if the execution condition of the another background task includes a requirement for the Wi-Fi connection status of the first electronic device, the task scheduler of the first electronic device 10 may also deliver a listening request to the state listener B.

S104: The task scheduler of the first electronic device 10 sends the background task ID to the task queue manager.

The task queue manager of the first electronic device 10 may store a plurality of background tasks and a priority of each background task. When receiving a new background task ID, the task queue manager may perform initialization, that is, re-determine a priority of each background task based on the new background task ID and the stored background task ID. In this embodiment of this application, a priority of a background task may be determined based on a frequency of using an application and running time of the background task.

S105: A state listener of the first electronic device 10 sends a detected condition and a corresponding task ID to the task queue manager of the first electronic device 10 if detecting that a specified condition is met.

In this embodiment of this application, the task queue manager of the first electronic device 10 may store the task execution condition, the task ID, and the application executing the task that are carried in the second background task request. The task queue manager of the first electronic device 10 may receive a notification reported by each state listener of the first electronic device 10. When the task queue manager of the first electronic device 10 receives a notification delivered by the state listener A and a notification delivered by the state listener B, the task queue manager detects that a task execution condition of a background task corresponding to a second task ID is met. The notification delivered by the state listener A is used to notify that the remaining battery power meets a condition of a background task corresponding to a background task ID: The remaining battery power is greater than 30%. The notification delivered by the state listener B indicates that the Wi-Fi connection meets a condition of a background task corresponding to a background task ID: successfully accessing Wi-Fi and being able to access a mobile communication network through Wi-Fi. The second task ID is an ID of the second background task.

In this embodiment of this application, a basic service layer in the first electronic device 10 may obtain statuses of the battery and the Wi-Fi module, and send a broadcast carrying battery power information and a broadcast carrying a Wi-Fi connection status. The state listener A of the first electronic device 10 may detect, by using the broadcast carrying battery power information, that the remaining power is greater than 30%. The state listener B of the first electronic device 10 may detect, by using the broadcast carrying a Wi-Fi connection status, that the state listener B successfully accesses Wi-Fi and may access the mobile communication network through Wi-Fi.

S106: The task queue manager of the first electronic device 10 notifies the task scheduler of the first electronic device 10 when the task queue manager of the first electronic device 10 detects that the task execution condition of the background task corresponding to the second task ID is met.

The notification sent by the task scheduler included in the task scheduling SA of the first electronic device 10 to a task scheduler may carry the second task ID and the application (the mobile phone application B) executing the task.

S107: The task scheduler of the first electronic device 10 obtains processor usage and memory usage of the task scheduler currently, and queries whether the mobile phone application B is in a running state.

In this embodiment of this application, when the task execution condition of the background task corresponding to the second task ID is met, the task scheduler of the first electronic device 10 may further view processor usage and memory usage currently. When the processor usage is less than a first threshold and the memory usage is less than a second threshold, the processor and the memory are sufficient to execute the background task corresponding to the second task ID.

Specifically, the basic service layer in the first electronic device 10 may also obtain a processor usage status and a memory usage status, and broadcast, in the first electronic device 10, a broadcast carrying processor usage information and a broadcast carrying usage information of the memory. The task scheduler of the first electronic device 10 may obtain the processor usage information and the memory usage information in the broadcasts.

In a possible embodiment, the mobile phone application B executes the background task only when the mobile phone application B that executes the background task corresponding to the second task ID is in a running state. In some other embodiments of this application, the mobile phone application B executes the background task no matter whether the mobile phone application B is in a running state or a closed state. When the mobile phone application B is in a closed state, the system of the mobile phone may open the mobile phone application B. In this embodiment of this application, that the mobile phone application B is in a running state means that the application is in a foreground running state or a background running state.

S108: The task scheduler of the first electronic device 10 obtains priorities of a plurality of background tasks from the task queue manager when the processor usage is less than the first threshold, the memory usage is less than the second threshold, the mobile phone application B is in a running state, and the plurality of background tasks need to be executed currently.

In this embodiment of this application, when the task scheduler of the first electronic device 10 detects that the plurality of background tasks need to be executed, the task scheduler of the first electronic device 10 may obtain the priorities of the plurality of tasks from the task queue manager. Then, the task scheduler of the first electronic device 10 sequentially sends notifications to corresponding applications based on the priorities, so that the applications execute the background tasks.

In some other embodiments of this application, in step S106, the task queue manager may sequentially send notifications to the task scheduler based on priorities. In steps S108 to S109, the task scheduler may send a second notification to the mobile phone application B based on the processor usage, the memory usage, and a status of the mobile phone application B without querying the priorities again. In some other embodiments of this application, the task scheduler may perform step S109 without obtaining processor usage and memory usage currently, or querying whether the mobile phone application B is in a running state.

S109: The task scheduler of the first electronic device 10 sends, by using the Harmony KIT of the first electronic device 10, the second notification to the mobile phone application B based on the priorities.

The second notification is used to notify the mobile phone application B to start executing the background task corresponding to the second task ID, namely, the background task of data synchronization. In some embodiments of this application, before the task scheduler sends the second notification to the mobile phone application B by using the Harmony KIT, the task scheduler may further request a package management service to verify the mobile phone application B to which the background task belongs. After the verification succeeds, the package management service may request to query an application package ID from the package management service based on an application package name. The package management service can query a corresponding application package ID based on an application package name. The task scheduler may find a corresponding application, namely, the mobile phone application B, based on the application package ID, and perform step S108. For a process in which the package management service verifies the application, refer to specific descriptions in the example described in FIG. 1. Details are not described herein again.

The application package ID may include one or more of a port identity document (port identity document, PID) and a user identity document (user identity document, UID) of the application.

S110: In response to the second notification, the mobile phone application B on the first electronic device 10 invokes a hardware module to perform data synchronization.

In this embodiment of this application, the hardware module may include a communication module. The mobile phone application B on the first electronic device 10 may synchronize data with the cloud server or another electronic device by using the communication module of the first electronic device 10. In a data synchronization process, the first electronic device 10 may obtain updated data on the cloud server or another electronic device, and add the updated data to local data. For example, in a process of synchronizing MeeTime contact data, the first electronic device 10 may obtain updated contact data under the account on the cloud server or another electronic device, and add the updated contact data to a local contact list. The first electronic device 10 may further transmit the updated contact data to the cloud server or another electronic device.

After performing step S110, the first electronic device 10 may record system time at which current data synchronization is performed, and display the system time in the prompt 105 on the user interface 100. For example, as shown in FIG. 7C, after performing data synchronization in step S110, the first electronic device 10 may record the system time 10:02 Jul. 1, 2020 and display the system time in the prompt 105.

In some embodiments, after the first electronic device notifies, by using the first distributed system, the second application (for example, the mobile phone application B) to execute the second background task, the first electronic device may further display a second prompt on the second application. The second prompt may indicate that "MeeTime contacts have been synchronized". The second prompt may alternatively be the prompt 105 shown in FIG. 7C.

Figure 8:
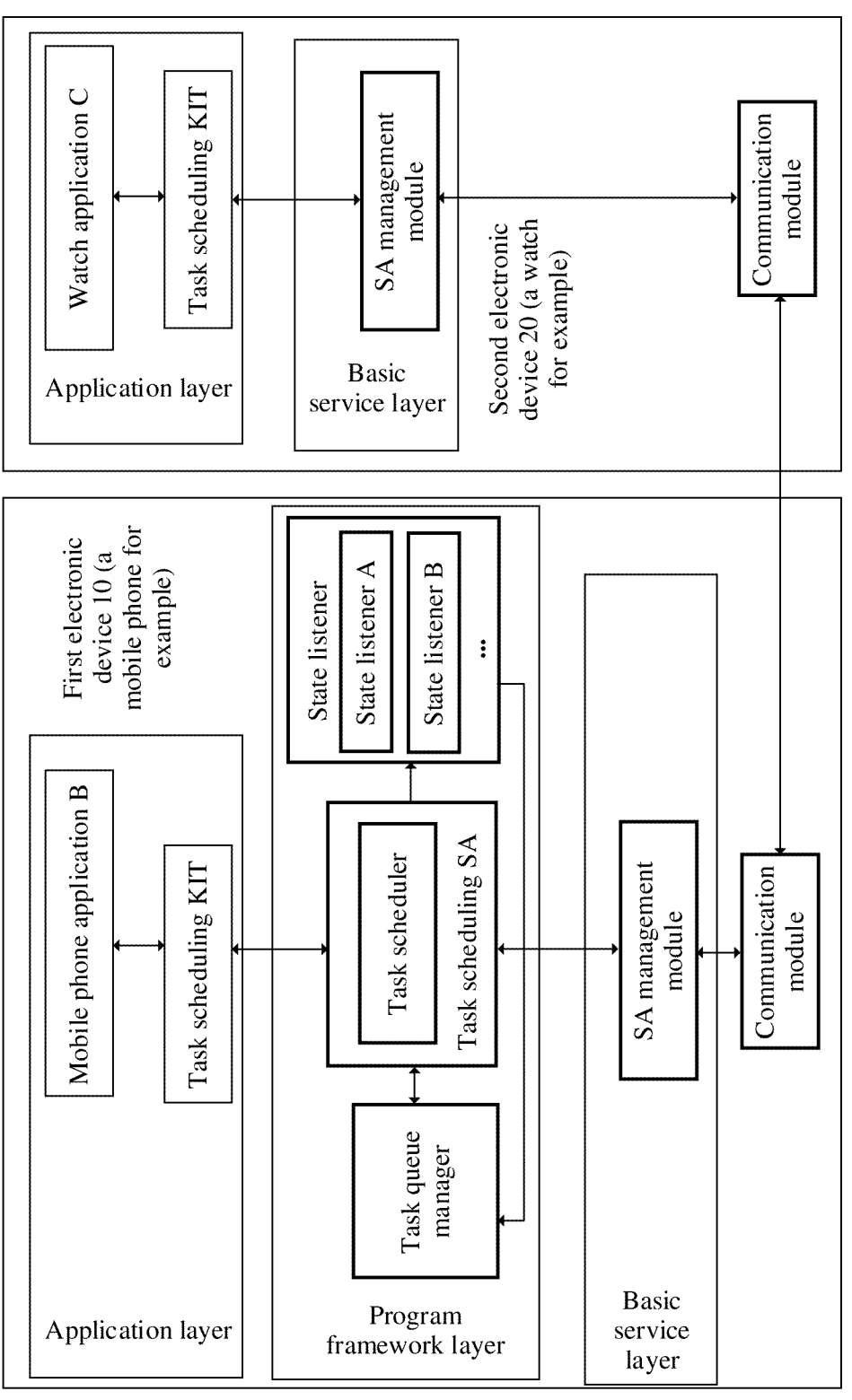
FIG. 8 is a schematic diagram of a system architecture according to an embodiment of this application.

The following describes, with reference to FIG. 8, the process in which the first electronic device 10 monitors the execution condition of the background task of the local mobile phone application B on the first electronic device 10, and executes the background task of the local mobile phone application B by using an example. FIG. 8 is a schematic diagram of a system architecture according to an embodiment of this application.

As shown in FIG. 8, the mobile phone application B may be installed in the first electronic device 10. The first electronic device 10 may receive a second user operation. The second user operation is, for example, a user operation performed on the synchronization control 101 on the user interface 10 described in FIG. 7A. In response to the second user operation, the mobile phone application B sends a second background task request to a task scheduler of the first electronic device 10 by using the Harmony KIT (for example, a task scheduling KIT). The second background task request may be used to request to synchronize contact information associated with a MeeTime account. The task execution condition may include: 1. Remaining power of the first electronic device 10 is greater than 30%. 2. The first electronic device 10 successfully accesses Wi-Fi, and may access a mobile communication network through Wi-Fi. Herein, the Harmony KIT uses the task scheduling KIT included in the Harmony KIT as an example for description. However, this does not constitute a limitation on this application.

The task scheduler of the first electronic device 10 may further send a background task ID to a task queue manager of the first electronic device 10. The task queue manager may re-determine a priority of each background task based on a new background task ID and a stored background task ID.

The task scheduler of the first electronic device 10 may send a listening request to the state listener A of the first electronic device 10 based on the second background task request. The listening request may be used to request the state listener A to detect whether the remaining power of the first electronic device 10 is greater than 30%. The task scheduler of the first electronic device 10 may further send the listening request to the state listener B that monitors a Wi-Fi connection status. The listening request may be used to request the state listener B to detect whether the first electronic device 10 accesses Wi-Fi, and whether Wi-Fi is available if the first electronic device 10 accesses Wi-Fi.

When detecting that the remaining power of the first electronic device 10 is greater than 30%, the state listener A may send a notification to the task queue manager of the first electronic device 10. The notification indicates that the remaining battery power meets a condition of a background task corresponding to a background task ID: The remaining power is greater than 30%. When detecting that the first electronic device 10 successfully accesses Wi-Fi and can access the mobile communication network through Wi-Fi, the state listener B may send a notification to the task queue manager of the first electronic device 10. The notification indicates that a Wi-Fi connection meets a condition of a background task corresponding to a background task ID: successfully accessing Wi-Fi and being able to access a mobile communication network through Wi-Fi. When the task queue manager of the first electronic device 10 receives a notification delivered by the state listener A and a notification delivered by the state listener B of the first electronic device 10, the task queue manager of the first electronic device 10 detects that a task execution condition of a background task corresponding to a second task ID is met. In this case, the task queue manager of the first electronic device 10 may query processor usage and memory usage currently, and check whether the mobile phone application B is in a running state.

The task queue manager of the first electronic device 10 may notify the task scheduler of the first electronic device 10 when the processor usage is less than the first threshold, the memory usage is less than the second threshold, and the mobile phone application B is in a running state. After receiving the notification, the task scheduler of the first electronic device 10 may send a second notification to the mobile phone application B by using the Harmony KIT. In response to the second notification, the mobile phone application B on the first electronic device 10 may invoke a hardware module to perform data synchronization.

Optionally, when the task queue manager detects that a plurality of background tasks need to be executed, the task queue manager of the first electronic device 10 may determine priorities of the plurality of tasks. Then, notifications are sequentially sent to the task scheduler based on the priorities, so that the application executes the background tasks.

It may be understood that this embodiment of this application is described by using an example in which the background task is a data synchronization task. However, this embodiment of this application is not limited to the data synchronization task, and may further include another type of background task, for example, pushing a notification or updating an application. This is not limited in this embodiment of this application.

In addition, in this embodiment of this application, the second user operation used to generate a background task of data synchronization is not limited to a user operation performed on the synchronization control 101 in FIG. 7A. The second user operation may alternatively be a user operation performed on a control on a user interface of another application. This is not limited in this embodiment of this application. In this embodiment of this application, a user operation triggers to generate a background task. Alternatively, a background task may be generated in another manner. For example, when detecting a new version, the mobile phone application B generates a background task for upgrading the version. In this embodiment of this application, some background tasks may alternatively be sent by a developer to the task scheduler of the first electronic device 10 in advance by using the Harmony KIT, and do not need to be triggered by a user operation.

In the embodiment described in FIG. 6, the distributed system in the first electronic device may execute background tasks in batches when a condition is met. This can reduce frequent wake-ups of a hardware module by the system, to reduce memory and processor overheads in the electronic device.

Figure 9A:
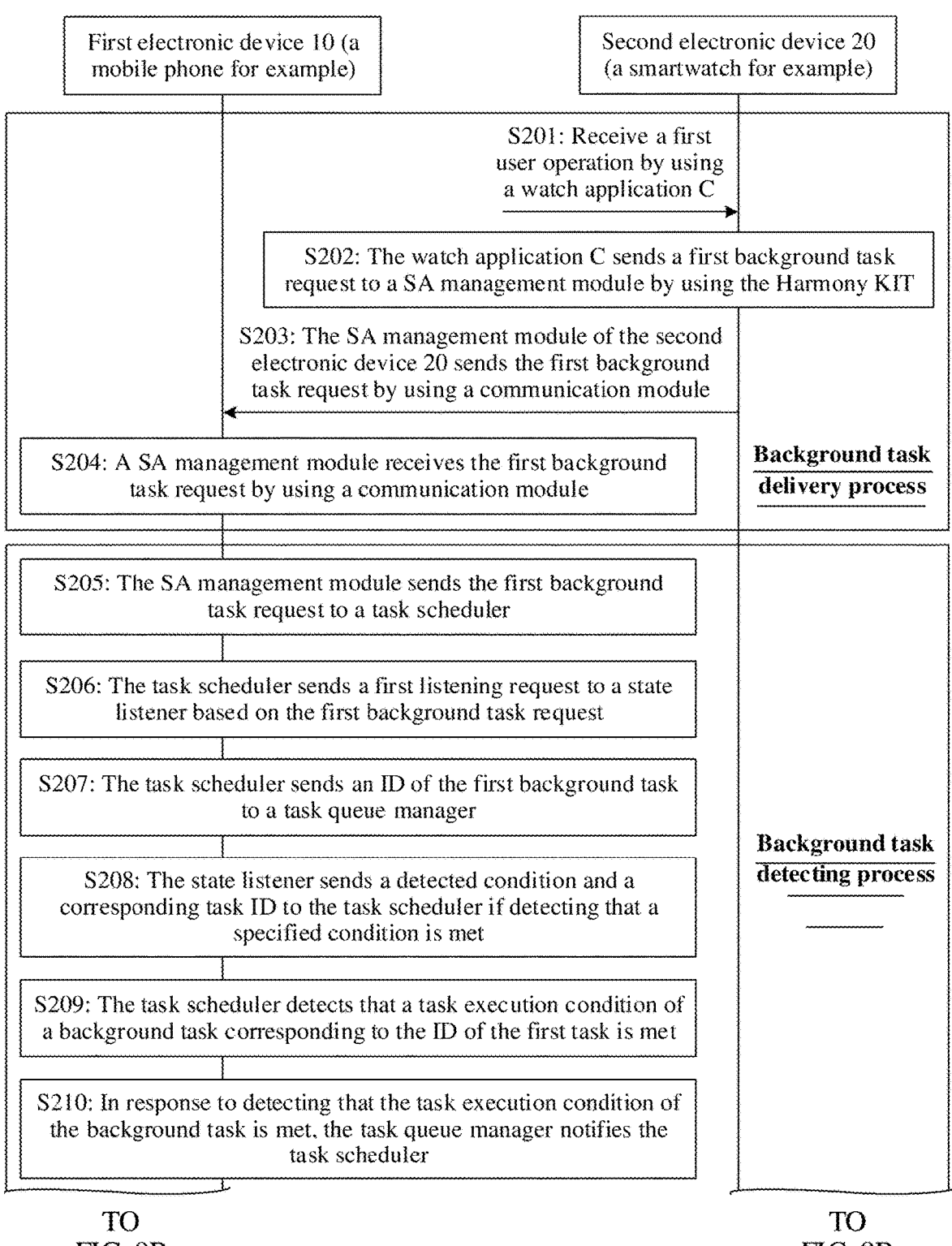

(2) The Process in which the First Electronic Device 10 Monitors the Execution Condition of the Background Task of the Watch Application C on the Second Electronic Device 20 by Using the First Distributed System, and Triggers the Watch Application C to Execute the Background Task FIG. 9A and FIG. 9B are a schematic flowchart of a background task execution method according to an embodiment of this application. With reference to the system architecture shown in FIG. 8 and the schematic flowchart shown in FIG. 9A and FIG. 9B, the background task execution method may include steps S201 to S215. The background task execution method may include a background task delivery process, a background task monitoring process, and a process of notifying execution of the background task.

(I) In the background task delivery process, the watch application C on the second electronic device 20 may send a background task request to the first electronic device 10 by using the second distributed system. For details, refer to steps S201 to S204.

In this embodiment of this application, the watch application C may be a first application. The first application may be a contact application installed in the second electronic device.

(II) In the background task monitoring process, the first electronic device 10 may monitor, by using the first distributed system, an execution condition of a background task on the second electronic device 20. For details, refer to steps S205 to S212.

(III) In a process of notifying execution of the background task, the first electronic device 10 may notify, by using the first distributed system, an application on the second electronic device 20 to execute the background task when detecting that a background task execution condition is met. For details, refer to steps S213 to S215.

S201: The second electronic device 20 receives a first user operation by using the watch application C. The first user operation is used by the watch application C to generate a first background task. The first background task is, for example, a background task of smartwatch data synchronization, for example, a background task of contact synchronization.

S202: The watch application C on the second electronic device 20 sends a first background task request to a SA management module by using the Harmony KIT.

In this embodiment of this application, the first user operation may correspond to the second user operation in the embodiment shown in FIG. 6. The first user operation may be a user operation performed on a user interface of the watch application C on the second electronic device 20.

In this embodiment of this application, an operation for triggering the watch application C to generate a background task is not limited to a user operation performed on the second electronic device 20, or may alternatively be a user operation performed on a user interface of the connected first electronic device 10. In some other embodiments of this application, the first background task may alternatively be sent by the watch application C to a task scheduler of the first electronic device 10 in advance by using the Harmony KIT of the second electronic device 20, and does not need to be triggered by a user operation. This is not limited in this embodiment of this application.

In this embodiment of this application, the first background task may be sent by the Harmony KIT of the second electronic device 20 to the SA management module of the second electronic device 20 by using a task scheduling SA of the second electronic device 20.

S203: The SA management module of the second electronic device 20 sends the first background task request to the first electronic device 10 by using a communication module.

The first background task request may carry a task execution condition of the first background task, a task ID of the first background task, and a name of an application package that executes the first background task. The first background task request may also carry an identifier of a device that executes the first background task.

The first background task request may be used to request to synchronize contact information associated with a Mee-Time account. The task execution condition may include: 1. Remaining power of the second electronic device 20 is greater than 30%. 2. The second electronic device 20 successfully accesses Wi-Fi, and may access a mobile communication network through Wi-Fi. The task ID uniquely identifies the background task. The application executing the background task may be indicated by using an application package name. The application may be the watch application C.

When step S203 is performed, a communication module of the first electronic device 10 may establish a communication connection to the communication module of the second electronic device 20. The communication connection is, for example, a wireless connection, for example, a Bluetooth connection or a Wi-Fi connection. The communication connection may alternatively be a mobile communication connection.

S204: A SA management module of the first electronic device 10 receives the first background task request by using the communication module.

S205: The SA management module of the first electronic device 10 sends the first background task request to the task scheduler of the first electronic device 10.

S206: The task scheduler of the first electronic device 10 sends a first listening request to a state listener based on the first background task request.

The task scheduler of the first electronic device 10 may deliver a listening request to each corresponding state listener. For a specific listening request delivery process, refer to descriptions in step S103 in the embodiment shown in FIG. 6. The state listener may obtain remaining power information and Wi-Fi connection information of the second electronic device 20 from a distributed data management in the basic service layer.

In this embodiment of this application, the second electronic device 20 may synchronize data in the distributed data management to the first electronic device 10 by using the second distributed system. The data synchronization may be performed periodically. In this way, the distributed data management of the first electronic device 10 may obtain real-time data of the second electronic device 20. The data in the distributed data management is a status parameter of the second electronic device, for example, the remaining power information and the Wi-Fi connection information of the second electronic device 20, and may be used by the first electronic device to determine whether the task execution condition of the first background task is met. The status parameter may be a reference factor for determining whether the task execution condition of the first background task is met.

S207: The task scheduler of the first electronic device 10 sends an ID of the first background task to the task queue manager of the first electronic device 10.

S208: The state listener of the first electronic device 10 sends a detected condition and a corresponding task ID to the task queue manager if detecting that a specified condition is met.

S209: The task queue manager of the first electronic device 10 detects that a task execution condition of a background task corresponding to the ID of the first background task is met.

The state listener of the first electronic device 10 may obtain the remaining power information and the Wi-Fi connection information of the second electronic device 20 from the distributed data management at the basic service layer. When detecting that the remaining power of the second electronic device 20 is greater than 30%, the state listener of the first electronic device 10 may send a notification to the task queue manager of the first electronic device 10. The notification indicates that the remaining battery power of the second electronic device 20 meets a condition of a background task corresponding to a background task ID: The remaining power is greater than 30%. When detecting that the second electronic device 20 successfully accesses Wi-Fi and can access a mobile communication network through Wi-Fi, the state listener of the first electronic device 10 may send a notification to the task queue manager of the first electronic device 10. The notification indicates that a Wi-Fi connection of the second electronic device 20 meets a condition of a background task corresponding to the background task ID: successfully accessing Wi-Fi and being able to access a mobile communication network through Wi-Fi.

Step S210 is performed when the task queue manager of the first electronic device 10 may determine, according to the two notifications reported by the state listener, that the task execution condition of the background task corresponding to the ID of the first background task is met.

In this embodiment of this application, the ID of the first background task may be associated with a device ID, for example, a device ID of the second electronic device 20. When the task execution condition of the background task corresponding to the ID of the first background task is met, the task queue manager of the first electronic device 10 may determine, based on an association relationship between the ID of the first background task and a device ID, that the first background task is a background task of the second electronic device 20, and perform step S210.

S210: In response to detecting that the task execution condition of the background task is met, the task queue manager of the first electronic device 10 notifies the task scheduler.

S211: The task scheduler of the first electronic device 10 queries, from the distributed data management, processor usage and memory usage of the second electronic device 20 currently.

In this embodiment of this application, the first electronic device 10 may further query, by using the distributed data management of the first electronic device 10, whether the watch application C on the second electronic device 20 is in a running state, and step S211 is performed only when the watch application C is in a running state.

In some other embodiments of this application, the first electronic device 10 may perform step S211 after performing step S209.

S212: When the second electronic device 20 may execute a background task based on device usage and the second electronic device 20 needs to execute a plurality of background tasks, the task scheduler of the first electronic device 10 obtains priorities of the plurality of background tasks from the task queue manager.

In this embodiment of this application, that the second electronic device 20 may execute the background task based on device usage means that processor usage is less than a first specified threshold, and memory usage is less than a second specified threshold. Values of the first specified threshold and the second specified threshold are not limited in this embodiment of this application.

Device usage of the second electronic device 20 is, for example, that processor usage of the second electronic device 20 is less than a third threshold, and memory usage of the second electronic device 20 is less than a fourth threshold. That the second electronic device 20 needs to execute the plurality of background tasks means that the first electronic device 10 detects that task execution conditions of the plurality of background tasks are met, and the plurality of background tasks are background tasks of the second electronic device 20.

In this embodiment of this application, when a plurality of background tasks need to be executed by the second electronic device 20, the task scheduler of the first electronic device 10 obtains priorities of the plurality of background tasks from the task queue manager. Then, the task scheduler of the first electronic device 10 sequentially notifies the second electronic device 20 to execute the background tasks at a specific time interval based on the priorities. A higher priority indicates that the task scheduler of the first electronic device 10 sends data earlier.

In this embodiment of this application, when the first electronic device 10 performs step S213, the first electronic device 10 establishes a communication connection to the second electronic device 20 by using the communication module.

S213: The task scheduler of the first electronic device 10 sends, by using the SA management module and the communication module of the first electronic device 10, a first notification to the communication module of the second electronic device 20 based on the priority.

The first notification may be used to notify the watch application C to start executing a background task corresponding to an ID of the first background task, namely, a background task of data synchronization. In some embodiments of this application, before the task scheduler of the first electronic device 10 sends the first notification by using the SA management module and the communication module, the task scheduler may further request, by using the application package name carried in the first background task request, a package management service in the first electronic device 10 to verify the watch application C to which the background task belongs. After the verification succeeds, the package management service in the first electronic device 10 may query a corresponding application package ID. The package management service in the first electronic device 10 may query the corresponding application package ID by using the application package name. The first notification may carry the application package ID. The application package ID corresponds to the watch application C, and is used by the second electronic device 20 to find a corresponding application, namely, the watch application C, based on the application package ID, and perform step S214.

S214: The SA management module of the second electronic device 20 receives the first notification, and sends a third notification to the watch application C.

The third notification may be used to notify the watch application C to start executing a background task of data synchronization.

S215: The watch application C on the second electronic device 20 invokes a hardware module to perform data synchronization.

It may be understood that this embodiment of this application is described by using an example in which a background task of the second electronic device 20 is a data synchronization task. However, in this embodiment of this application, the background task of the second electronic device 20 is not limited to a data synchronization task, and may further include another type of background task, for example, pushing a notification or updating an application. This is not limited in this embodiment of this application.

Figures 10A, 10B, 10C:
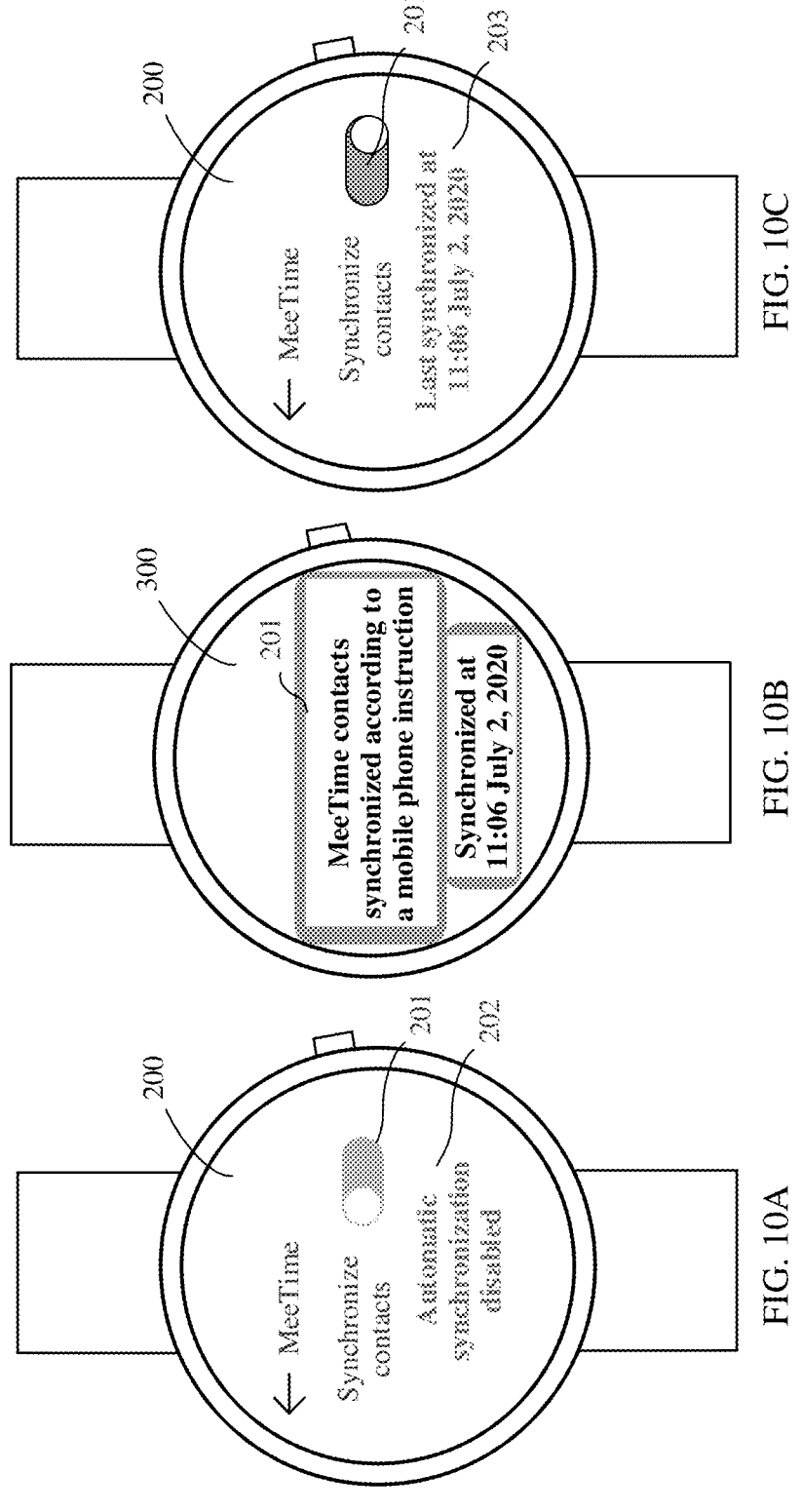
FIG. 10A to FIG. 10C are schematic diagrams of a user interface according to an embodiment of this application.

The following describes how to execute the first background task with reference to user interfaces of the second electronic device 20. FIG. 10A to FIG. 10C are schematic diagrams of a user interface according to an embodiment of this application. As shown in FIG. 10A, by analogy with FIG. 7A, a user interface 200 is a user interface for setting a smartwatch to automatically perform contact synchronization. The user interface 200 may include a control 201 and a prompt 202. For descriptions of the control 201, refer to the synchronization control 101 in FIG. 7A. For the prompt 202, refer to the prompt 102 in FIG. 7A. In response to a user operation performed on the control 201, the watch application C on the second electronic device 20 may perform step S202 to send the first background task request to a background task triggering. The user operation performed on the control 201 is the first user operation. In response to the user operation performed on the control 201, the second electronic device 20 may display a state of the control 201 from an off state to an on state.

In some embodiments of this application, as shown in FIG. 10B, after the second electronic device 20 completes step S214, the second electronic device 20 may display a user interface 300. The user interface 300 may include a prompt 201. The prompt 201 may indicate "MeeTime contacts synchronized according to a mobile phone instruction. Synchronized at 11:06 Jul. 2, 2020."

In this embodiment of this application, the prompt 201 may be a first prompt. The first prompt is output by using the first application on the second electronic device. The first prompt is used to indicate that the first application has performed contact synchronization.

It may be understood that, in this embodiment of this application, an example in which the prompt is a prompt displayed on an interface is used for description. However, a form of the prompt is not limited in this embodiment of this application, and may alternatively be a manner such as a voice.

[moo] In some embodiments of this application, as shown in FIG. 10C, after performing data synchronization in step S214, the second electronic device 20 may record system time 11:06 Jul. 2, 2020 at which data synchronization is performed, and display the system time in a prompt 203.

To implement the embodiment described in FIG. 9A and FIG. 9B, the first electronic device 10 may be used as a core device, and monitor a task execution condition of another device (for example, the second electronic device 20) by using the first distributed system installed in the first electronic device 10. When detecting, by using the first distributed system, that the task execution condition of the second electronic device 20 is met, the first electronic device 10 may notify, by using the communication module, the second distributed system in the second electronic device 20 to execute a task. In this way, because a processing capability of a processor and a memory of the first electronic device 10 may be far stronger than those of the smartwatch or the band, the following is less frequent: the second electronic device 20 struggles to monitor a task execution condition when memory usage and processor usage are high. Therefore, efficiency of executing a background task is improved.

For example, in the "1+8+N" strategy, "1" means that mobile phones can be used as core devices, and "8" means four large-screen devices (personal computers, tablets, smart big screens, and head units) and 4 non-large-screen devices (headphones, speakers, smartwatches, and glasses). "N" refers to the HiLink ecosystem composed of Internet of things (Internet of things, IoT) hardware. Distributed systems can be installed in all devices in the "1+8+N" strategy. The mobile phones, as the core devices, monitors task execution conditions of other devices through installed distributed systems (e.g. devices represented by "8" and devices represented by "N"). The second electronic device 20 may be included in the devices represented by "8". When detecting, by using a distributed system, that the task execution condition of the second electronic device 20 is met, the mobile phone may notify, by using the communication module, the second electronic device 20 to execute a task. In this way, because a processing capability of a processor and a memory of the mobile phone may be far stronger than those of the smartwatch or the band, the following is less frequent: the second electronic device 20 struggles to monitor a task execution condition when memory usage and processor usage are high. Therefore, efficiency of executing a background task is improved.

It may be understood that, in the embodiments described in FIG. 6, FIG. 8, FIG. 9A, and FIG. 9B, the first electronic device may be the mobile phone, and the distributed system installed in the first electronic device may be the first distributed system. The second electronic device may be a smartwatch, and the distributed system installed in the second electronic device may be the second distributed system.

The following describes device status parameters monitored by a state listener in this embodiment of this application.

Figure 11:
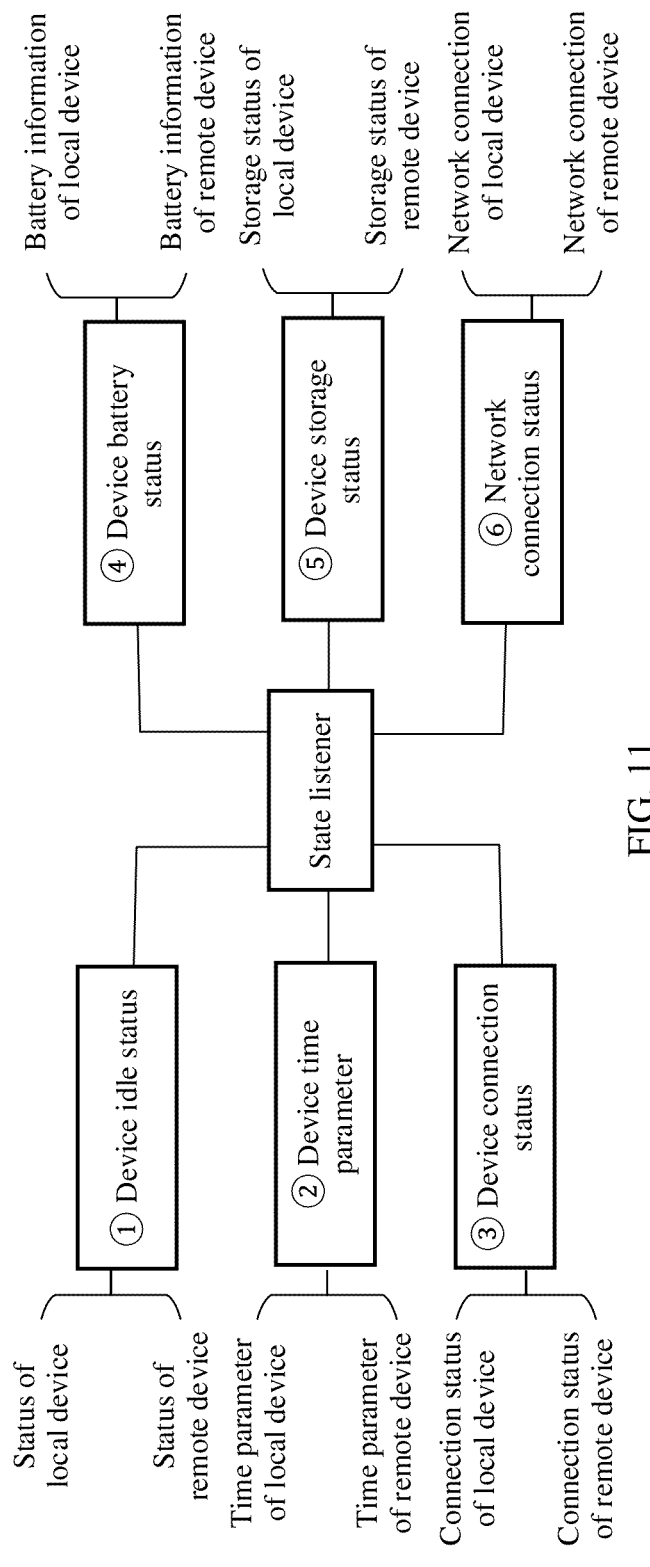
FIG. 11 is an example of status parameters of a monitoring device according to an embodiment of this application.

Refer to Table 1 and FIG. 11. Table 1 is an example of device status parameters monitored by state listeners according to an embodiment of this application. FIG. 11 is an example of status parameters of a monitoring device according to an embodiment of this application. It may be understood that the device status parameters in this embodiment of this application are merely used as an example, and should not constitute a limitation.

43

TABLE 1

| Device status parameters monitored by state listeners | | |
|---|---|---|
| Device status parameter | Device | Parameter value |
| ① Device idle status | Local device | Whether the device is in an idle state |
|  | Remote device | Whether the device is in an idle state |
| ② Device time parameter | Local device | Whether to trigger in a specific time point or a specific time period |
|  | Remote device | Whether to trigger in a specific time point or a specific time period |
| ③ Device connection status | Local device | Whether to establish a Wi-Fi or Bluetooth connection to another device |
|  | Remote device | Whether to establish a Wi-Fi or Bluetooth connection to another device |
| ④ Device battery status | Local device | Remaining battery power, battery power consumption speed, and the like |
|  | Remote device | Remaining battery power, battery power consumption speed, and the like |
| ⑤ Device storage status | Local device | Memory usage and remaining memory of the device |
|  | Remote device | Memory usage and remaining memory of the device |
| ⑥ Network connection status | Local device | Whether to connect to a data network or Wi-Fi network |
|  | Remote device | Whether to connect to a data network or Wi-Fi network |

As shown in Table 1 and FIG. 11, each device status parameter may be monitored by using a state listener. The state listener is a state listener in the software system in the local device. The state listener of the first electronic device 10 may obtain a listening request from the task scheduler of the first electronic device 10. The state listener of the first electronic device 10 may store a detected condition and an ID of a corresponding background task. For example, the state listener A configured to monitor remaining battery power of the local device (the first electronic device 10 such as the mobile phone) in step S103 in the embodiment shown in FIG. 6 may store a monitoring condition: whether the remaining power of the first electronic device 10 is greater than 30%, and may store a correspondence between the detected condition and a background task ID. When the state listener A of the first electronic device 10 detects that the condition (whether the remaining power of the first electronic device 10 is greater than 30%) is met, the state listener A of the first electronic device 10 may report the condition and the corresponding background task ID to the task queue manager of the first electronic device 10. When detecting that all execution conditions (for example, remaining power and a Wi-Fi connection) of a background task corresponding to the background task ID are met, the task queue manager of the first electronic device 10 may notify, based on priorities, an application to execute the background task corresponding to the background task ID.

For another example, the state listener configured to monitor remaining battery power of the remote device (the second electronic device 20 such as the smartwatch) in step S206 in the embodiment shown in FIG. 9A and FIG. 9B may store a monitoring condition: whether the remaining battery power of the second electronic device 20 is greater than 30%, and may store a correspondence between the detected condition and a background task ID. The state listener of the first electronic device 10 may obtain a battery status parameter of the second electronic device 20 from the distributed data management of the first electronic device 10, and detect whether an execution condition of the background task is met. When the state listener of the first electronic device 10 detects that the condition (whether the remaining power of the second electronic device 20 is greater than 30%) is met, the state listener of the first electronic device 10 may report the condition and the corresponding background task ID to the task queue manager of the first electronic device 10. When detecting that all execution conditions (for example, remaining power of the second electronic device 20 and a Wi-Fi connection of the second electronic device) of the background task corresponding to the background task ID are met, the task queue manager of the first electronic device 10 may notify, based on priorities, an application on the second electronic device 20 to execute the background task.

As shown in Table 1 and FIG. 11, a state listener that monitors a device idle state of the local device and that is in the first electronic device 10 may detect, based on a listening request delivered by the task scheduler of the first electronic device 10, whether the local device (for example, the first electronic device 10 in the context, specifically a mobile phone) is in an idle state.

For example, the idle state may mean that the local device is currently in a screen-off state. For another example, the idle state may mean that both processor usage and memory usage of the local device are less than a threshold. It may be understood that the foregoing example of the idle state is merely used to explain this embodiment of this application, and should not constitute a limitation. The idle state may be defined in another manner. This is not limited in this embodiment of this application.

A state listener that monitors a device idle state of the remote device and that is in the first electronic device 10 may detect, based on a listening request delivered by the task scheduler of the first electronic device 10, whether the remote device (for example, the second electronic device 20 in the context, specifically a smartwatch) is in an idle state. Specifically, the state listener may obtain the device idle status of the second electronic device 20 from the distributed data management, and detect whether an execution condition of a background task is met.

Similarly, the device time parameter may be used to indicate whether the local device/remote device performs triggering in a specific time point (for example, the system time is 03:00). The device time parameter may alternatively be used to indicate whether the local device/remote device performs triggering in a scheduled time period. For example, when the state listener receives a listening request, a start timing point is 12 hours later, and a timing period is 12 hours later.

The device connection status may be used to indicate whether the local or remote device establishes a Wi-Fi or Bluetooth connection to another device. For example, a distributed system is installed in both the first electronic device 10 and the second electronic device 20. When the first electronic device 10 establishes a Bluetooth connection to the second electronic device 20, the state listener that is in the first electronic device 10 and that monitors a device connection status of the first electronic device 10 may detect that the Bluetooth connection to the second electronic device 20 has been established. A state listener that is in the first electronic device 10 and that monitors a device connection status of the second electronic device 20 may obtain, from the distributed data management, that the second electronic device 20 has established a Bluetooth connection to the first electronic device 10, to detect that the Bluetooth connection to the first electronic device 10 has been established.

The device storage status may be used to indicate remaining memory and memory usage of the local device or remote device.

The network connection status may be used to indicate whether the local device/remote device is connected to a data network, whether the local device/remote device is connected to Wi-Fi, or the like.

The following describes a priority of each background task in this embodiment of this application.

In this embodiment of this application, the task scheduler of the first electronic device 10 may sort priorities of background tasks in descending order. For a background task of a local application on the first electronic device 10, when a plurality of background tasks meet a task execution condition, the task scheduler may notify, based on priorities, a corresponding application to execute a corresponding background task. For a background task of an application on the remote device (for example, the second electronic device 20), when a plurality of background tasks meet a task execution condition, the task scheduler may sequentially notify, based on priorities by using a communication connection, an application on the remote device to execute a responding background task. In this way, a plurality of background tasks are sequentially executed, which can reduce freezing caused by extremely high processor and memory usage when the plurality of background tasks are simultaneously executed. This improves smoothness of executing background tasks.

Figure 12:
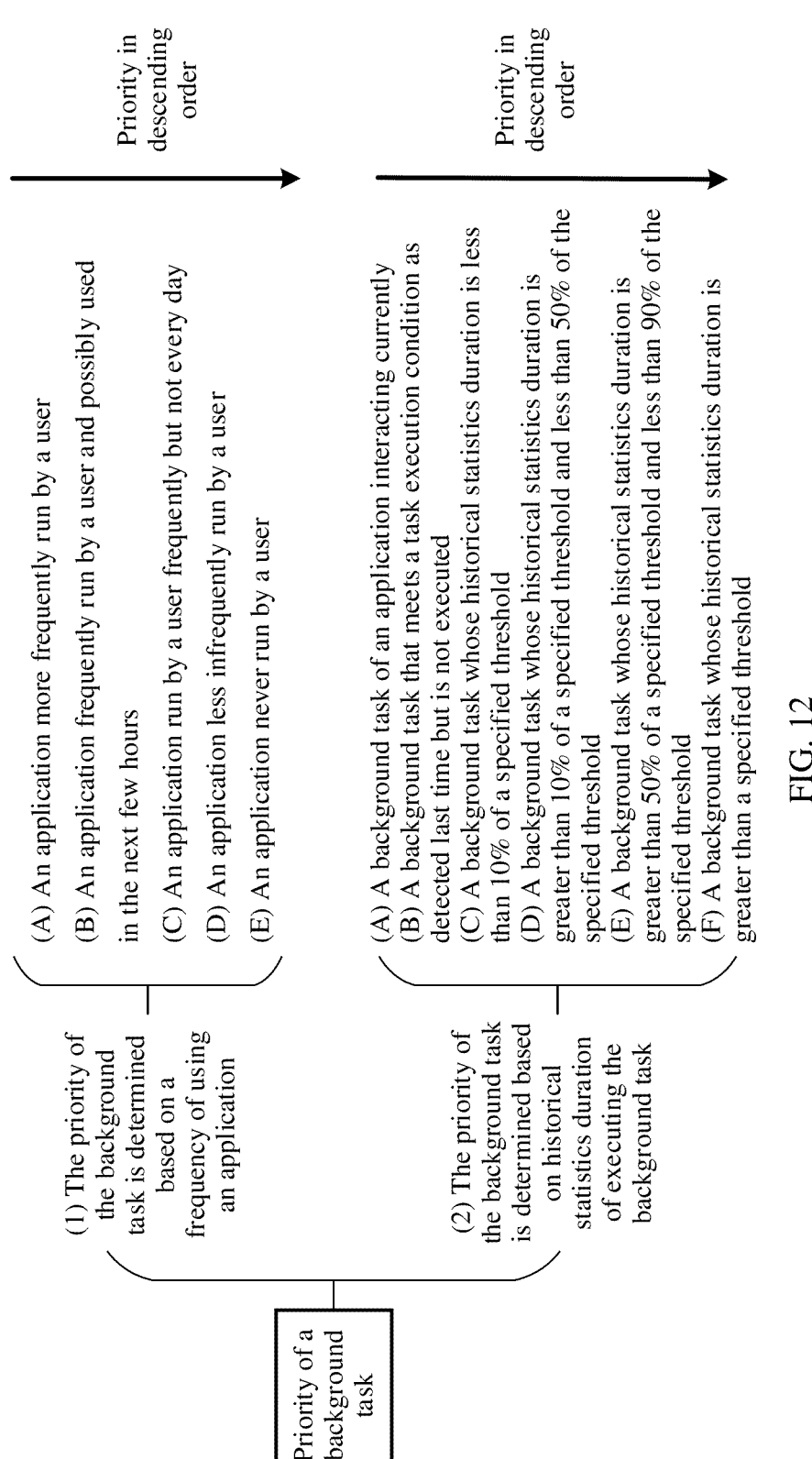
FIG. 12 is an example in which a priority of a background task is determined according to an embodiment of this application.

In this embodiment of this application, a priority of a background task may be determined based on frequency of using a corresponding application. A higher frequency indicates a higher priority of the background task. A priority of a background task may alternatively be determined based on historical statistics duration of executing the background task. Longer historical statistics duration indicates a lower priority of the background task. The following describes the two methods for determining a priority of a background task. The following describes a priority provided in an embodiment of this application with reference to FIG. 12. FIG. 12 is an example in which a priority of a background task is determined according to an embodiment of this application.

(1) A priority of a background task is determined based on a frequency of using an application.

In this embodiment of this application, the task queue manager of the first electronic device 10 may obtain statistics for usage frequency and daily usage time about an application on the local application/an application on the remote device, and determine a priority of a background task of an application based on the statistics for the usage frequency and daily usage time about the application. A higher usage frequency and longer daily usage duration indicate a higher priority of a background task of an application.

The task queue manager may obtain the statistics for the usage frequency and daily usage time about the application on the remote device from the distributed data management. The distributed data management in the first electronic device 10 may be synchronized with the second electronic device 20, to obtain current latest data of each application on the second electronic device 20. The following provides an example in which a priority of a background task is determined based on a frequency of using an application.

For example, as shown in FIG. 12, the task queue manager may divide applications into the following types: an application more frequently run by a user, an application frequently run by a user, an application run by the user frequently but not every day, an application less frequently run by a user, and an application never run by a user.

(A) The application more frequently run by a user means that quantity of times of opening the application is greater than a first threshold, and a frequency of opening the application every day in a statistical period is greater than a second threshold. How the application is opened may be from a closed state to an open state, and from a background running state to a foreground running state.

(B) The application frequently run by a user means that quantity of times of opening the application and a frequency of opening the application every day in a statistical period meet the following conditions: The quantity of times of opening the application is less than a first threshold and greater than a third threshold. The frequency of opening the application every day in a statistical period is less than a second threshold and greater than a fourth threshold. The third threshold may be less than the first threshold, and the fourth threshold may be less than the second threshold. The first electronic device may further obtain, by analyzing the collected data about duration in which the user uses an application, that the user may use the application in set time in the future (for example, in a few hours in the future).

(C) The application run by the user frequently but not every day means that quantity of times of opening the application is greater than a fifth threshold and that is not opened every day in a statistical period. The fifth threshold is not limited.

(D) The application less frequently run by a user means that quantity of times of opening the application is less than a sixth threshold. The sixth threshold is less than the fifth threshold.

(E) The application never run by a user is an application not opened in a statistical period.

The task queue manager lowers priorities of corresponding background tasks based on statistics of (A) to (E). In this case, when a plurality of background tasks meet a task execution condition, the task queue manager may notify, based on the priorities, an application with a highest priority to execute a background task. After a notification is sent, an application with a second highest priority is notified after a period of time to execute the background task. In this way, applications are sequentially notified based on the priorities to execute a corresponding background application. The period of time is not limited in this embodiment of this application.

It may be understood that the foregoing example in which the priority is determined based on the frequency of using the application is merely used to explain this embodiment of this application, and should not constitute a limitation.

In the embodiment described in FIG. 9A and FIG. 9B, the data in the distributed data management includes at least one of the following: a frequency of using the first application on the second electronic device 20, or historical statistics duration of executing the first background task. The first electronic device may determine a priority of the first background task based on the data. The priority may be used by the first electronic device to determine a sequence of executing a plurality of background tasks of the second electronic device.

(2) A priority of a background task is determined based on historical statistics duration of executing the background task.

In this embodiment of this application, the task queue manager of the first electronic device 10 may obtain historical statistics duration of executing a background task. A background task with longer historical statistics duration has a lower priority, and a background task with shorter historical statistics duration has a higher priority. The following provides an example in which a priority of a background task is determined based on historical statistics duration of executing the background task. For example, as shown in FIG. 12, the task queue manager may further divide applications into the following types:

(A) a background task of an application interacting currently, which means that a background task of an application currently running in the foreground may have a highest priority;

(B) a background task that meets a task execution condition as detected last time but is not executed;

(C) a background task whose historical statistics duration is less than 10% of a specified threshold, where the historical statistics duration may be obtained by calculating an average value of duration of executing the task each time before the task queue manager obtains the task;

(D) a background task whose historical statistics duration is greater than 10% of a specified threshold and less than 50% of the specified threshold;

(E) a background task whose historical statistics duration is greater than 50% of a specified threshold and less than 90% of the specified threshold; and (F) a background task whose historical statistics duration is greater than a specified threshold.

The task queue manager lowers priorities of corresponding background tasks based on statistics of (A) to (F). It may be understood that the foregoing example in which the priority is determined based on the historical statistics duration of executing the background task is merely used to explain this embodiment of this application, and should not constitute a limitation. In this embodiment of this application, another completely fair scheduler (completely fair scheduler, CFS) algorithm may be used to determine priorities of a plurality of background tasks that meet a task execution condition.

In this embodiment of this application, a device for monitoring a task execution condition of a background task of the second electronic device 20 is not limited to the first electronic device 10. The second electronic device 20 may further monitor the task execution condition of the background task of the second electronic device 20 by using a distributed system in the second electronic device 20.

Specifically, in a possible implementation, when an application on the second electronic device 20 delivers a background task request to the task scheduler of the second electronic device 20, the second electronic device 20 may determine in advance processor usage and memory usage when a corresponding background task is executed. When the processor usage is greater than a specified threshold, or the memory usage is greater than a specified threshold, the second electronic device 20 may send a background task request to the first electronic device 10 by using the SA management module and the communication module. The first electronic device 10 monitors, according to the embodiment described in FIG. 9A and FIG. 9B, an execution condition of a background task of an application on the second electronic device 20, and triggers the application to execute the background task. When the processor usage for executing a background task is less than a specified threshold, or the memory usage is less than a specified threshold, the second electronic device 20 may monitor a task execution condition of a background task by using the distributed system, and trigger the application to execute the background task. The process is similar to that described in the embodiment described in FIG. 6.

In this way, the following is less frequent: the second electronic device 20 struggles to monitor a task execution condition when memory usage and processor usage are high. In addition, the second electronic device 20 can further share an execution condition monitoring task of the first electronic device 10. Therefore, efficiency of executing a task is improved.

An embodiment of this application further provides a computer-readable storage medium. The computer-readable storage medium stores instructions. When the instructions are run on a computer or a processor, the computer or the processor is enabled to perform one or more steps in any one of the foregoing methods.

An embodiment of this application further provides a computer program product including instructions. When the computer program product runs on a computer or a processor, the computer or the processor is enabled to perform one or more steps in any one of the foregoing methods.

In the foregoing embodiments, all or some of the functions may be implemented by using software, hardware, or a combination of software and hardware. When software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A task processing method comprising:

receiving, by a second electronic device, a first user operation by using a first application, the second electronic device establishing a communication connection to a first electronic device, the first application being installed in the second electronic device, a first operating system being installed in the first electronic device, and a second operating system being installed in the second electronic device;

in response to the first user operation, sending, by the second electronic device, a first background task request to the first operating system of the first electronic device by using the second operating system, wherein the first background task request carries a task execution condition of a first background task, and the first background task request is used by the first electronic device to detect, by using the first operating system, whether the task execution condition of the first background task is met;

receiving, by the second electronic device, a first notification by using the second operating system, wherein the first notification comprises information notifying the first application to execute the first background task; and in response to the received first notification, notifying, by the second electronic device by using the second operating system, the first application to execute the first background task, wherein the first application executes the first background task, wherein the first electronic device monitors at least one status parameter of the second electronic device to determine whether the task execution condition is met, wherein the first application is a contact application installed in the second electronic device, and the first background task is a background task of synchronizing one or more contacts of the first application, wherein the execution condition of the first background task comprises remaining power of the second electronic device being greater than 30%, and the second electronic device accesses a communication network through Wireless Fidelity (Wi-Fi).

2. The method according to claim 1, wherein after the notifying, by the second electronic device by using the second operating system, the first application to execute the first background task, the method further comprises:

displaying, by the second electronic device, a first prompt on the first application, wherein the first prompt indicates that the first application has performed contact synchronization.

3. The method according to claim 1, wherein the method further comprises:

synchronizing, by the second electronic device, data from distributed data management of the second electronic device to the first electronic device by using the second operating system, wherein the data in the distributed data management is a reference factor used by the first electronic device to determine whether the task execution condition of the first background task is met.

4. The method according to claim 3, wherein the data in the distributed data management comprises at least one of the following: a frequency of using the first application on the second electronic device, or a historical statistics duration of executing the first background task; and the data in the distributed data management is also a reference factor used by the first electronic device to determine a priority of the first background task, wherein the priority is used by the first electronic device to determine a sequence of executing a plurality of background tasks by the second electronic device.

5. A task processing method comprising:

receiving, by a first electronic device, a first background task request from a second operating system of a second electronic device by using a first operating system, the first electronic device establishing a communication connection to the second electronic device, the first operating system being installed in the first electronic device, the second operating system being installed in the second electronic device, a first application being installed in the second electronic device, wherein the first background task request carries a task execution condition of a first background task, and the first background task is a background task of the first application;

detecting, by the first electronic device by using the first operating system, whether the task execution condition of the first background task is met, wherein detecting comprises monitoring at least one status parameter of the second electronic device to determine whether the task execution condition is met; and when it is detected that the task execution condition of the first background task is met, sending, by the first electronic device, a first notification to the second operating system of the second electronic device by using the first operating system, wherein the first notification comprises information notifying the first application to execute the first background task, wherein the first application executes the first background task, wherein when it is detected that the task execution condition of the first background task is met, the method further comprises:

obtaining, by the first electronic device, processor usage and memory usage of the second electronic device by using the first operating system; and the sending, by the first electronic device, a first notification to the second operating system of the second electronic device by using the first operating system comprises:

when the processor usage is less than a first specified threshold and the memory usage is less than a second specified threshold, sending, by the first electronic device, the first notification to the second operating system of the second electronic device by using the first operating system.

6. The method according to claim 5, wherein a second application is installed in the first electronic device, and the method further comprises:

receiving, by the first electronic device, a second user operation by using the second application;

in response to the second user operation, detecting, by the first electronic device by using the first operating system, whether a task execution condition of a second background task is met, wherein the second background task is a background task of the second application; and when it is detected that the task execution condition of the second background task is met, notifying, by the first electronic device by using the first operating system, the second application to execute the second background task.

7. The method according to claim 6, wherein the second application is a contact application installed in the first electronic device, and the second background task is a background task of synchronizing one or more contacts of the second application; and after the notifying, by the first electronic device by using the first operating system, the second application to execute the second background task, the method further comprises:

displaying, by the first electronic device, a second prompt on the second application, wherein the second prompt is used to indicate that the second application has performed contact synchronization.

8. The method according to claim 5, wherein the first operating system comprises distributed data management; and the detecting, by the first electronic device by using the first operating system, whether the task execution condition of the first background task is met comprises:

obtaining, by the first electronic device, a status parameter of the second electronic device from the distributed data management; and determining, by the first electronic device based on the status parameter of the second electronic device, whether the task execution condition of a second background task is met, wherein the second background task is a background task of a second application installed in the first electronic device.

9. The method according to claim 5, wherein the first electronic device stores priorities of a plurality of background tasks of the second electronic device, and the plurality of background tasks comprise the first background task; and when it is detected that the task execution condition of the first background task is met, the method further comprises:

obtaining, by the first electronic device, a priority of the first background task by using the first operating system; and the sending, by the first electronic device, a first notification to the second operating system of the second electronic device by using the first operating system comprises:

sending, by the first electronic device, the first notification to the second operating system of the second electronic device based on the priority of the first background task by using the first operating system.

10. The method according to claim 9, wherein the first operating system further comprises distributed data management; and the method further comprises:

receiving, by the first electronic device, data from the second operating system of the second electronic device by using the first operating system, and storing the data in the distributed data management, wherein the data in the distributed data management comprises at least one of the following: a frequency of using the first application on the second electronic device, or a historical statistics duration of executing the first background task; and the priority of the first background task is determined by using the data in the distributed data management.

11. A first electronic device, wherein the first electronic device comprises one or more processors and a memory, a second application is installed in the first electronic device, and a first operating system is installed in the first electronic device;

the memory is configured to store programs, the programs comprise instructions, and the memory is further configured to store the first operating system; and when the instructions are executed by the first electronic device, the first electronic device is enabled to perform the operations:

receiving a first background task request from a second operating system of a second electronic device by using the first operating system, wherein the first background task request carries a task execution condition of a first background task, and the first background task is a background task of a first application installed in the second electronic device;

detecting by using the first operating system, whether the task execution condition of the first background task is met, wherein the detecting comprises monitoring at least one status parameter of the second electronic device to determine whether the task execution condition is met;

when it is detected that the task execution condition of the first background task is met, sending a first notification to the second operating system of the second electronic device by using the first operating system, wherein the first notification comprises information notifying the first application to execute the first background task, wherein the first application executes the first background task;

obtaining processor usage and memory usage of the second electronic device by using the first operating system; and the sending a first notification to the second operating system of the second electronic device by using the first operating system comprises:

when the processor usage is less than a first specified threshold and the memory usage is less than a second specified threshold, sending the first notification to the second operating system of the second electronic device by using the first operating system.

12. The first electronic device according to claim 11, wherein the second application is installed in the first electronic device; and the operations further comprise:

receiving a second user operation by using the second application;

in response to the second user operation, detecting by using the first operating system, whether a task execution condition of a second background task is met, wherein the second background task is a background task of the second application; and when it is detected that the task execution condition of the second background task is met, notifying by using the first operating system, the second application to execute the second background task.

13. The first electronic device according to claim 12, wherein the second application is a contact application installed in the first electronic device, and the second background task is a background task of synchronizing one or more contacts of the second application; and after the notifying by using the first operating system, the second application to execute the second background task, the operations further comprise:

displaying a second prompt on the second application, wherein the second prompt is used to indicate that the second application has performed contact synchronization.

14. The first electronic device according to claim 11, wherein the first operating system comprises distributed data management; and the detecting, by the first electronic device by using the first operating system, whether the task execution condition of the first background task is met comprises:

obtaining a status parameter of the second electronic device from the distributed data management; and determining based on the status parameter of the second electronic device, whether the task execution condition of a second background task is met, wherein the second background task is a background task of the second application.

15. The first electronic device according to claim 11, wherein the first electronic device stores priorities of a plurality of background tasks of the second electronic device, and the plurality of background tasks comprise the first background task; and when it is detected that the task execution condition of the first background task is met, the operations further comprise:

obtaining a priority of the first background task by using the first operating system; and the sending a first notification to the second operating system of the second electronic device by using the first operating system comprises:

sending the first notification to the second operating system of the second electronic device based on the priority of the first background task by using the first operating system.

16. The first electronic device according to claim 15, wherein the first operating system further comprises distributed data management; and the operations further comprise:

receiving data from the second operating system of the second electronic device by using the first operating system, and storing the data in the distributed data management, wherein the data in the distributed data management comprises at least one of the following: a frequency of using the first application on the second electronic device, or a historical statistics duration of executing the first background task; and the priority of the first background task is determined by using the data in the distributed data management.

* * * * *